US008647544B2

(12) United States Patent
Burch

(10) Patent No.: US 8,647,544 B2
(45) Date of Patent: Feb. 11, 2014

(54) METHOD FOR MANUFACTURING SCHOOL BUS SEAT WITH ENERGY ABSORBER AND USING SAME

(76) Inventor: Selwyn Arthur Burch, Bay Village, OH (US)

( * ) Notice: Subject to any disclaimer, the term of this patent is extended or adjusted under 35 U.S.C. 154(b) by 727 days.

(21) Appl. No.: 12/035,767

(22) Filed: Feb. 22, 2008

(65) Prior Publication Data

US 2008/0143157 A1 Jun. 19, 2008

Related U.S. Application Data

(63) Continuation-in-part of application No. 11/104,948, filed on Apr. 13, 2005, which is a continuation-in-part of application No. 10/954,782, filed on Sep. 30, 2004, now Pat. No. 7,338,119.

(51) Int. Cl.
*B29C 67/20* (2006.01)
(52) U.S. Cl.
USPC ..................... 264/46.6; 297/452.58
(58) Field of Classification Search
USPC ............. 264/46.6; 297/452.59, 452.6, 452.61
See application file for complete search history.

(56) References Cited

U.S. PATENT DOCUMENTS

| 2,942,653 | A | * | 6/1960 | Zerbee ............................. 267/83 |
| 4,383,712 | A | | 5/1983 | Kaganas |
| 4,688,662 | A | | 8/1987 | Correll |
| 4,860,415 | A | * | 8/1989 | Witzke ............................ 29/91.1 |
| 5,059,671 | A | * | 10/1991 | Taniguchi et al. ............... 528/49 |
| 5,061,419 | A | * | 10/1991 | Kouda et al. ................. 264/46.6 |
| 5,114,209 | A | | 5/1992 | Dunn |
| 5,324,462 | A | * | 6/1994 | Rohn ............................. 264/46.4 |
| 5,478,136 | A | * | 12/1995 | Takeuchi et al. ............... 297/391 |
| D369,055 | S | | 4/1996 | Bode |
| 5,609,395 | A | * | 3/1997 | Burch ....................... 297/452.55 |
| 5,690,384 | A | * | 11/1997 | Rossi .......................... 297/283.1 |
| D387,604 | S | | 12/1997 | Melone |
| D403,195 | S | | 12/1998 | Irwin-Tesmer |
| D440,107 | S | | 4/2001 | Hsu |
| 6,250,718 | B1 | | 6/2001 | Newhouse et al. |

(Continued)

OTHER PUBLICATIONS

Barry Metzler,"Hennecke's Nafpurtec and Compurtec Equipment Technology for Lightweight Automotive Moldings", 5 pages, Hennecke Machinery Group, Bayer MaterialScience LLC, 100 Bayer Road, Pittsburgh, PA 15205.

Ignacio G. Osio et al, "Attachment Strategies for Baypreg F-Sandwich Composites" pp. 1-9, Bayer MaterialScience, 100 Bayer Road, Pittsburgh, PA 15205.

(Continued)

*Primary Examiner* — Galen Hauth
(74) *Attorney, Agent, or Firm* — Woodling, Krost and Rust

(57) ABSTRACT

A method and an apparatus for manufacturing an envelope style bus seat back cushion includes the steps of opening a hinged mold and then spraying the cavity of the mold with an elastomeric skin. The hinged mold includes first and second sides having a cavity in each of the sides. The cavities of the mold combine to form a mold cavity. The sides of the mold include interengaging faces, ridges and recesses. The faces, ridges and recesses interengage to seal the mold. Once the first and second sides of the hinged mold are closed and intermate, the steps of injecting a urethane foam into the mold cavity of the closed hinged mold are inserting, quickly, a center core insert into the mold cavity of the closed hinged mold; curing the urethane foam; removing the center core insert from the mold cavity; opening the first and second sides of the mold cavity; and, removing and demolding the envelope style bus seat back cushion from the mold.

10 Claims, 31 Drawing Sheets

(56) References Cited

U.S. PATENT DOCUMENTS

| | | |
|---|---|---|
| 6,412,872 B2 | 7/2002 | Takeda et al. |
| 6,415,494 B1 | 7/2002 | Burch |
| D478,456 S | 8/2003 | Yoon |
| D491,405 S | 6/2004 | Jones |
| D536,566 S * | 2/2007 | Burch .......................... D6/611 |
| 7,338,119 B2 | 3/2008 | Burch |
| 2002/0135217 A1 | 9/2002 | Liu |
| 2003/0098598 A1 * | 5/2003 | English et al. ............. 297/219.1 |
| 2003/0141752 A1 | 7/2003 | Igarashi |
| 2005/0140190 A1 | 6/2005 | Kawashima |
| 2006/0076819 A1 * | 4/2006 | Burch ...................... 297/452.18 |
| 2009/0058168 A1 * | 3/2009 | Billingsley ............... 297/452.61 |

OTHER PUBLICATIONS

Ronald A. Cageao, et al, "Studies of Composites Made With Baypreg F Component Selection for Optimal Mechanical Properties", pp. 1-11 Bayer Material Science 100 Bayer Road Pittsburgh PA 15205.

R. A. Cageao, "Composite Production Process", Polyurethanes Specialties, Oct. 20, 2004, Slides 3-6, Bayer Material Science 100 Bayer Road Pittsburgh PA 15205.

Urethane Specialties "Product Data: ElastoFlex 26840R / Elastoflex 26850T", 2 pages. BASF Corporation, 1419 Biddle Avenue, Wyandotte, Michigan 48192-3799.

Urethane Specialties, "Preliminary Product Data: BASF Elastoskin S 52220 Spray Aromatic Urethane Elastomer Skin for Non-Automotive Seating Applications", 1 page, BASF Corporation, 1419 Biddle Avenue, Wyandotte, Michigan 48192-3799.

* cited by examiner

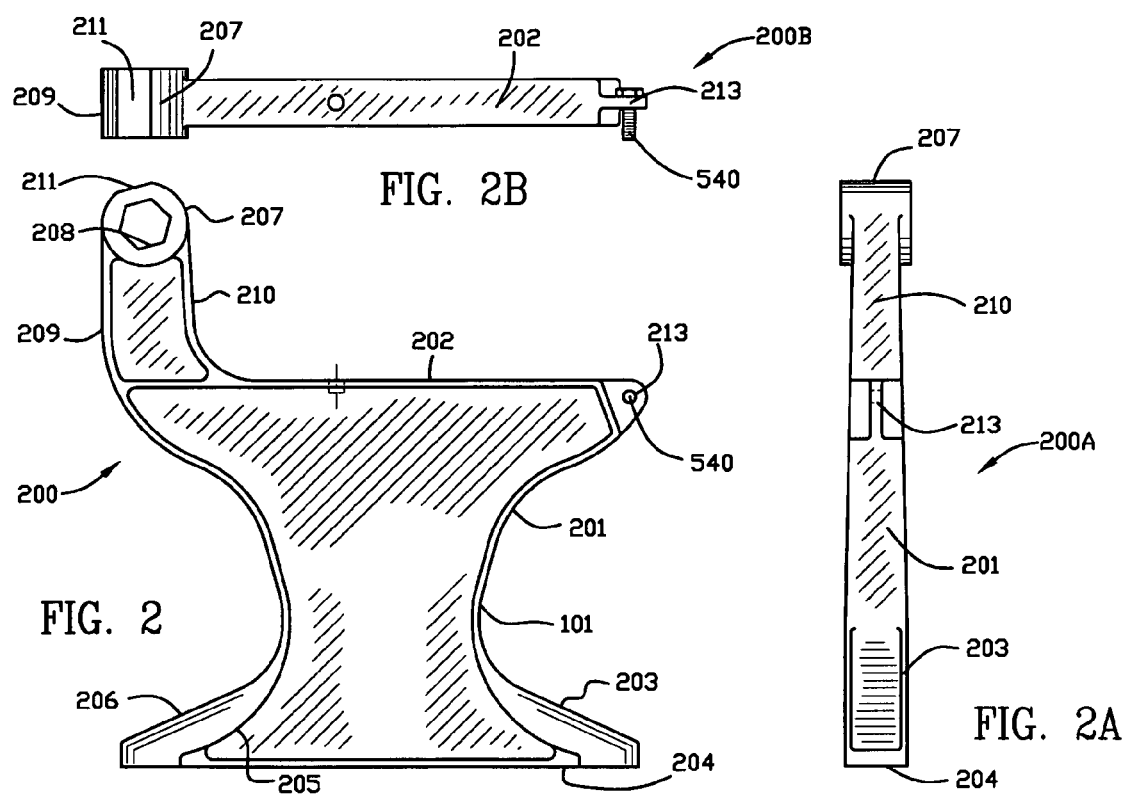

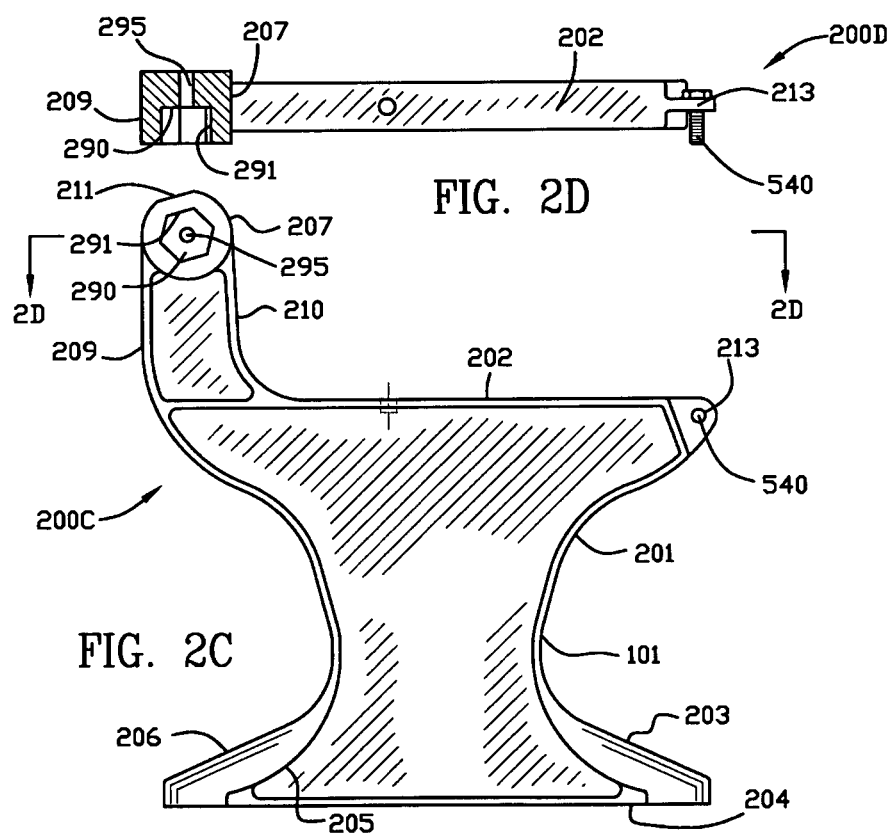

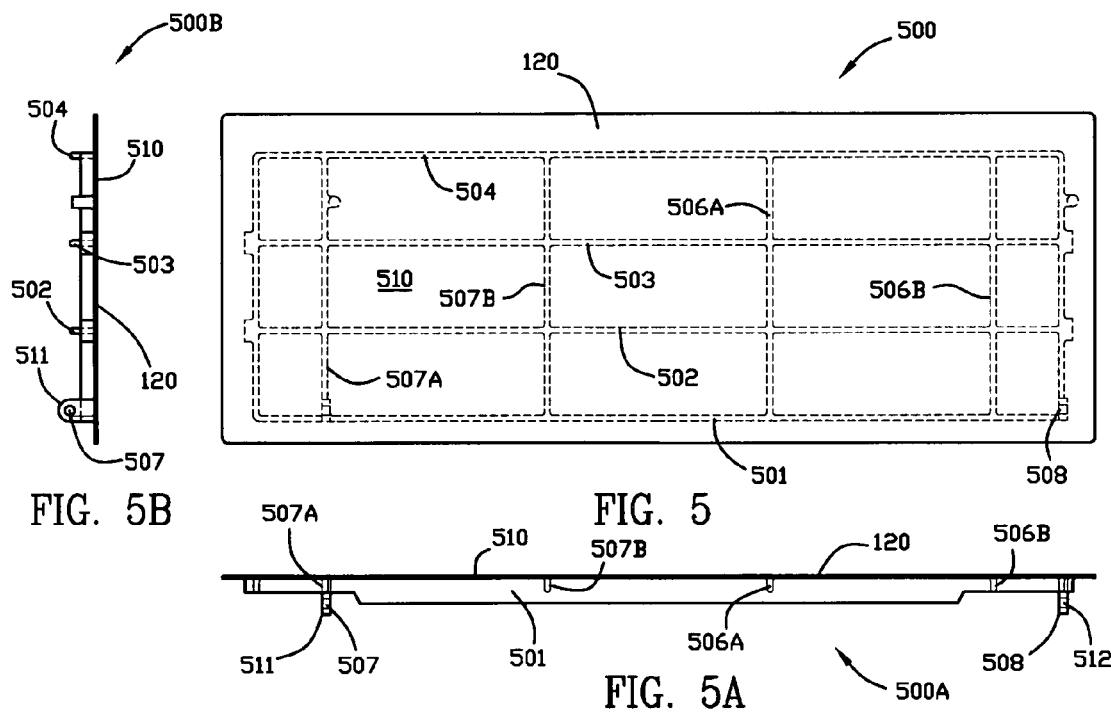

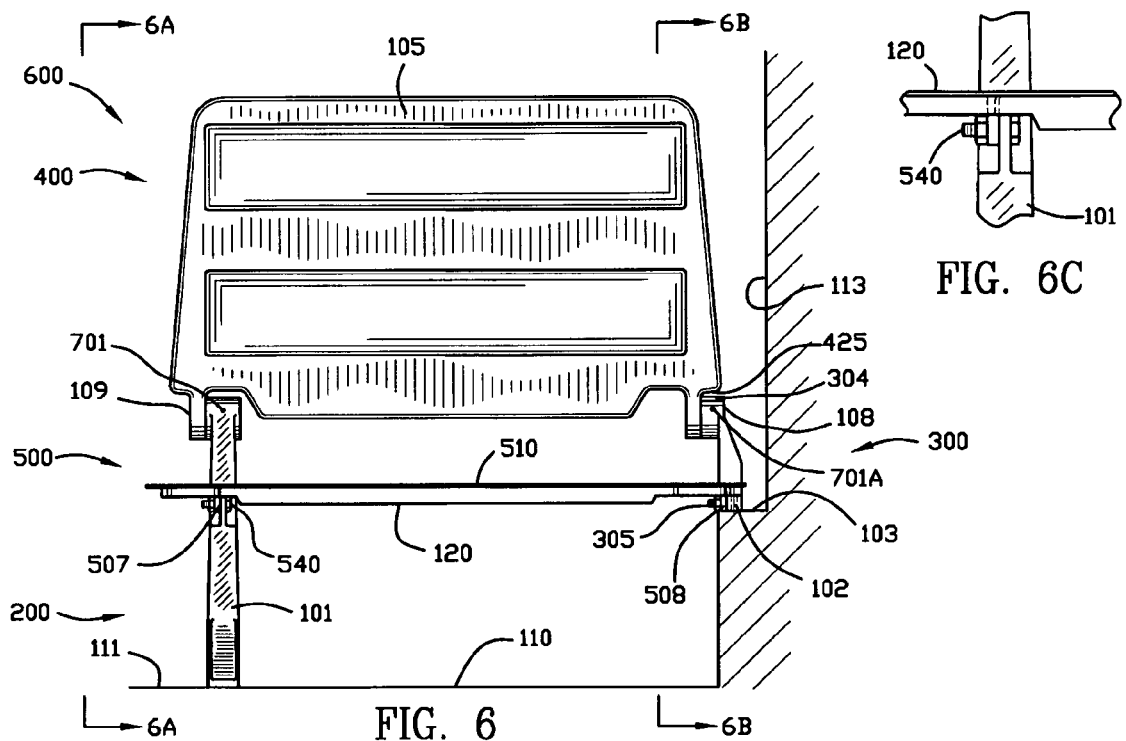

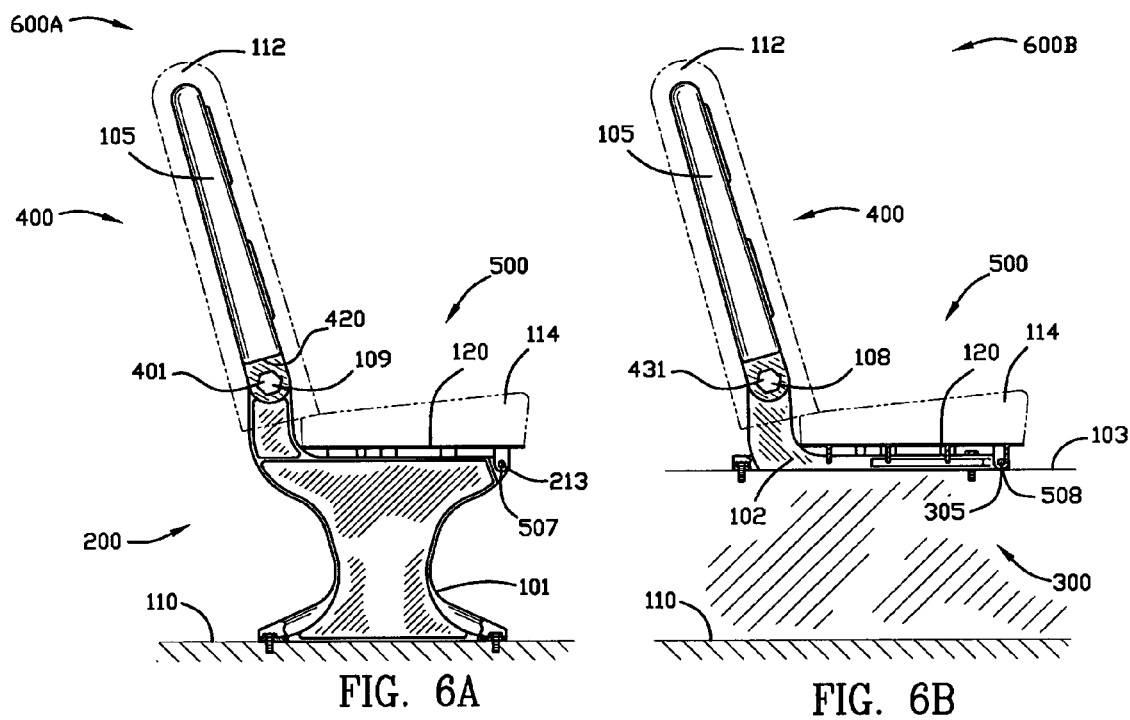

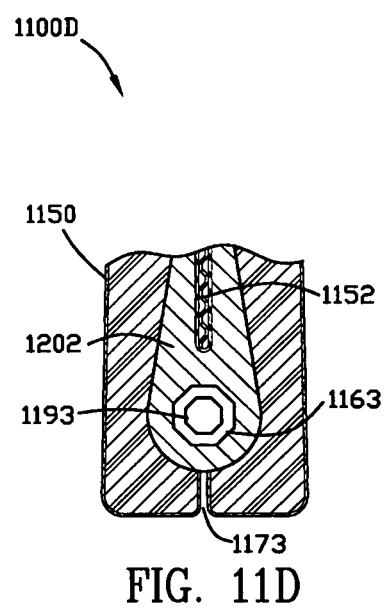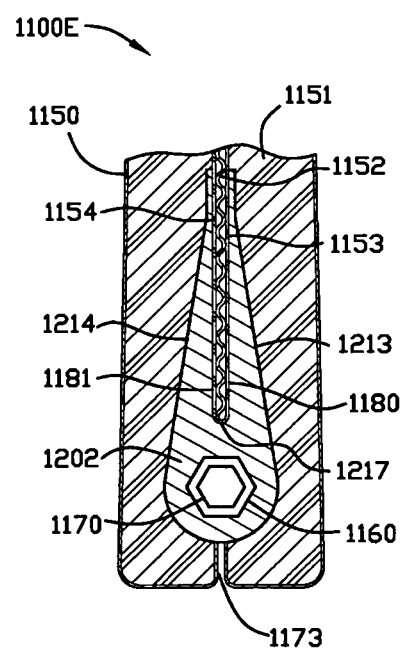

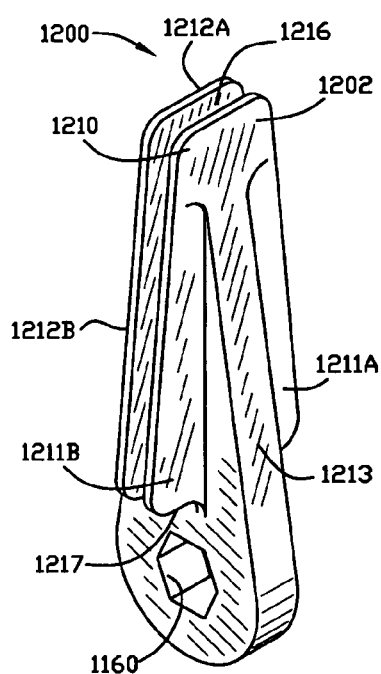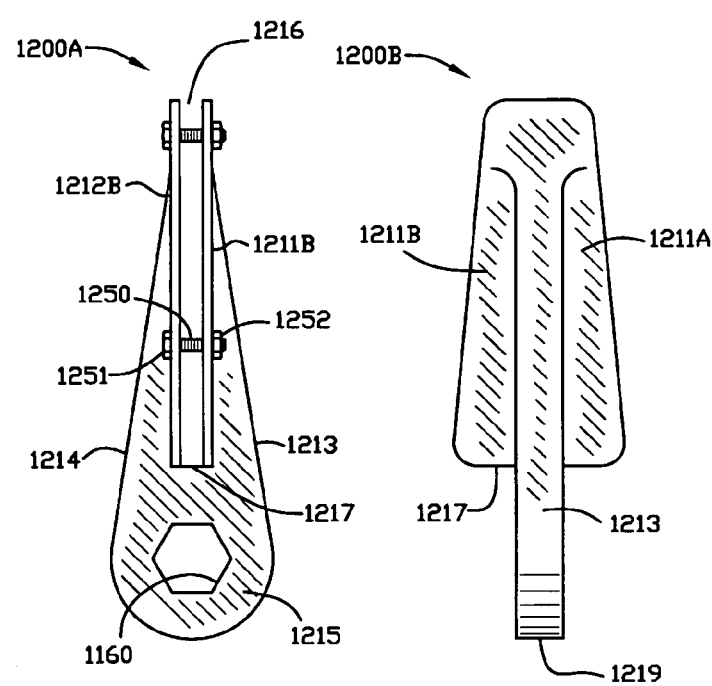
FIG. 12    FIG. 12A    FIG. 12B

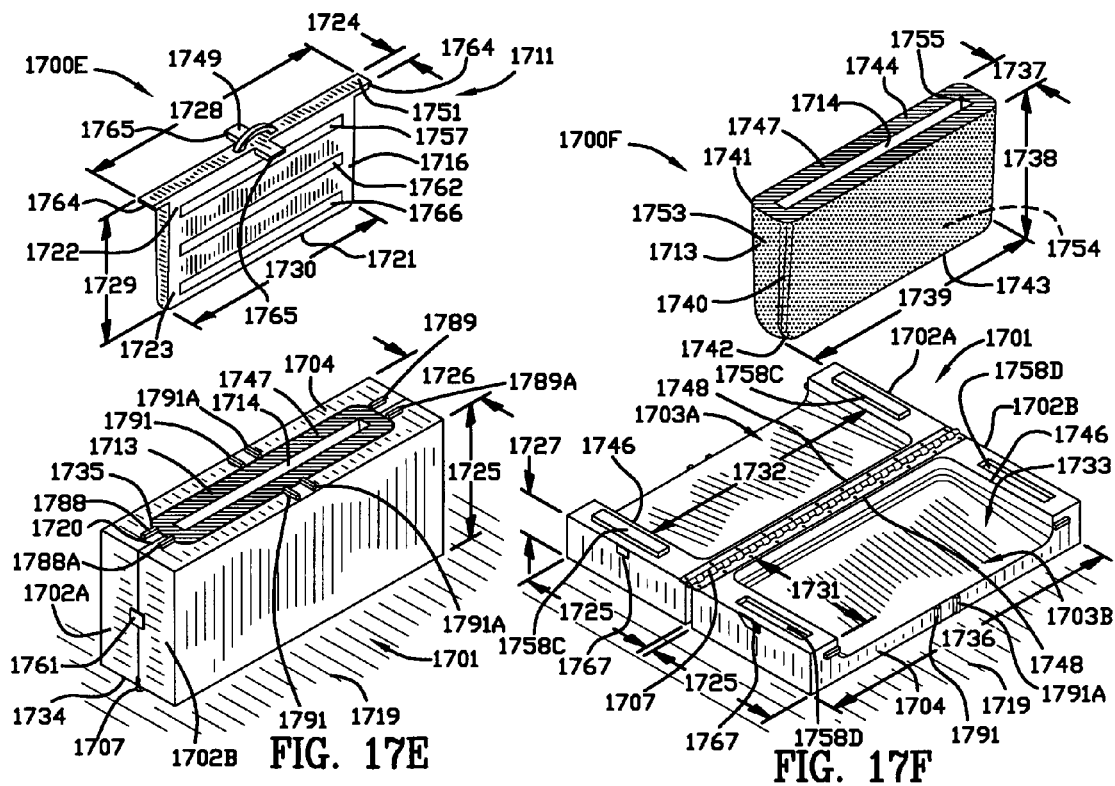

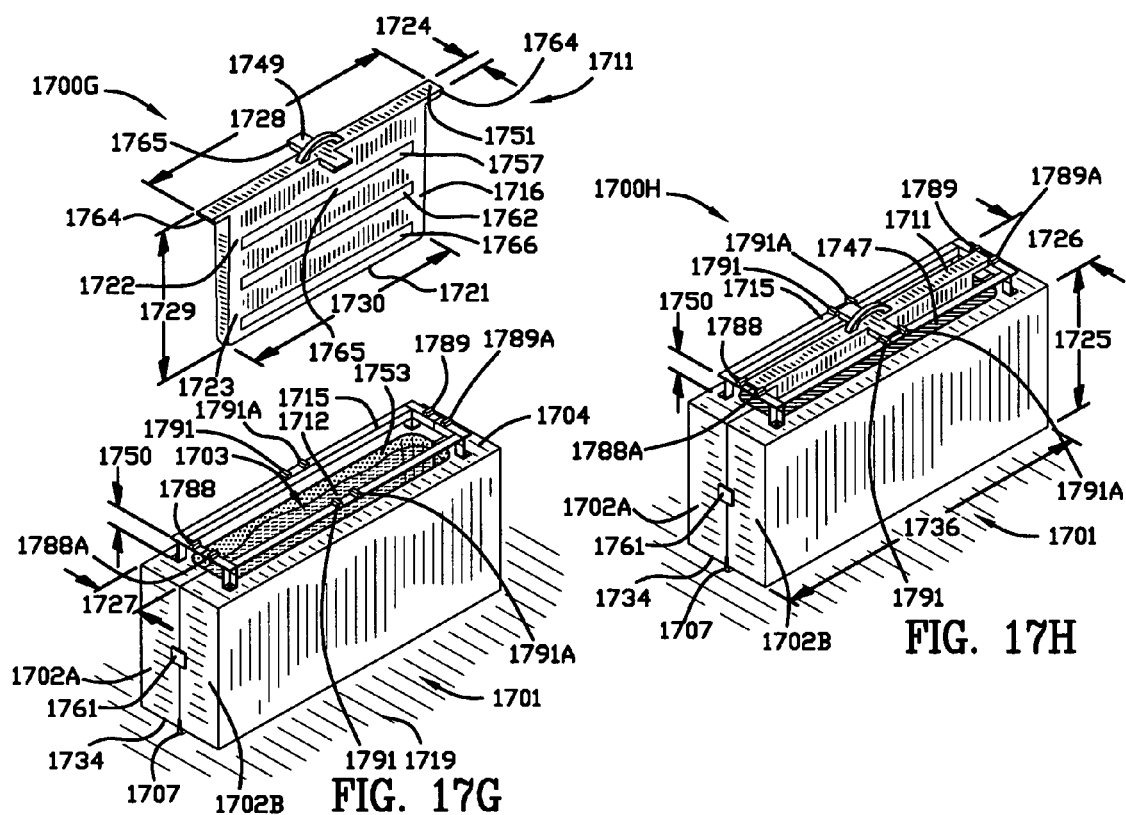

METHOD FOR MANUFACTURING SCHOOL BUS SEAT WITH ENERGY ABSORBER AND USING SAME

This patent application is a continuation-in-part of co-pending patent application Ser. No. 11/104,948 filed Apr. 13, 2005 which is a continuation-in-part of patent application Ser. No. 10/954,782 filed Sep. 30, 2004 now U.S. Pat. No. 7,338,119.

FIELD OF THE INVENTION

The invention is in the field of school bus seats which must meet federal regulatory standards to protect school bus riders, in particular, children riding on school buses.

BACKGROUND OF THE INVENTION

Present technology used in school bus seats is quite old. Essentially, school bus seats are presently made using metal or metal and wood. Wood or metal is secured to the metal seat back frame and metal frame bottom. A covering which may include some type of foam is also used. The covering and foam are subject to wear and tear as well as vandalism.

Some of the problems associated with the present technology are set forth in my U.S. Pat. Nos. 5,609,395 and 6,415,494, which I incorporate herein by reference. U.S. Pat. No. 6,415,494 is a divisional of application Ser. No. 08/530,451 filed on Sep. 18, 1995 now U.S. Pat. No. 5,609,395. Applicant also incorporates by reference Ser. No. 11/104,948 filed Apr. 13, 2005 and U.S. patent application Ser. No. 10/954,782 filed Sep. 30, 2004.

My U.S. Pat. No. 5,609,395 issued Mar. 11, 1997 disclosed and claimed a modular bus seat and method of retrofitting existing bus seats. My '395 patent discloses a bus seat comprising a metal frame, a bus seat back and a bus seat. My '395 patent discloses a bus seat back which includes a front modular portion, a rear modular portion, and a collar portion. The front modular portion is affixed to the metal frame. The rear modular portion is affixed to the front modular portion. The collar portion is affixed to the front modular portion adjacent the front and rear modular portions. The bus seat is affixed to the metal frame. The modular construction of the bus seat back enables replacement of a specific section or sections of the bus seat. The bus seat back and bus seat can be used in retrofit installations or in new installations using the existing metal frame technology. The bus seat back and bus seat are constructed of an elastomer skinned urethane foam which adheres to front, rear and bottom pieces of plywood. The collar portion is constructed of the elastomer skinned urethane foam but does not include a plywood portion. The collar portion is affixed to the front plywood portion.

My U.S. patent application Ser. No. 29/204,361 discloses a design for School Bus Seat Back Envelope Cushion and was filed on Apr. 28, 2004.

Federal Motor Vehicle Safety Standard No. 222 sets forth the safety standards for school bus seats. The safety standard addresses size, loading, energy absorption and deflection requirements.

U.S. Pat. No. 4,688,662 to Correll discloses an Energy Absorber System utilizing a pair of housings having facing cavities which includes a hollow deformable torsion member interconnecting the housings. One portion of the torsion member is received in the cavity of one housing and another portion of the torsion member is received in the cavity of the other housing. The housing cavities have cross-sectional conformations which receive the torsion member in such a manner that relative rotation therebetween is prevented. Rotation of one housing relative to the other deforms the torsion member elastically and/or plastically. Such deformation absorbs the energy of forces tending to rotate the housings. It will be noticed that Correll discloses a four-sided energy absorber. Use of such an absorber has the effect of creating knit lines in the plastic surrounding the energy absorber or torsion member. At column 5, lines 27 et seq. Correll states: "The torsion member again has a polygonal cross-sectional conformation so as to closely mate with the side walls of the cavities and thereby prevent relative rotation between the torsion member and the housings. As shown in FIG. 6, torsion member 90 comprises an elongated hollow tubular member with axial portions thereof received in the housings. The inner periphery 94 of the tubular member closely receives filling areas 96 which extend inwardly thereinto from a pair of opposed end caps 98. Filling areas 96 conform to the interior of torsion member 90 to shorten the effective length thereof (FIG. 6) for reasons previously described." Correll teaches that torsion members must be closely mated with respective cavities and that the torsion members may be filled to adjust the tolerance of the energy absorber from a torque standpoint. Correll contemplates use of a stampable fiber reinforced plastic for its housings and other materials. Knit lines are formed when fiber reinforced materials are molded and when obstructions to flow are present. When the flow path involves right angles knit lines are formed as the right angles provide an obstruction to flow. Knit lines do not integrate fibers with the polymeric material. Knit lines do not join the fibers together.

Although old school bus seats can be retrofitted and new seats can be manufactured as taught by my inventions as set forth in my '395 and '494 patents, it is highly desirable to provide a new school bus seat with superior safety performance and which is attractive and comfortable.

SUMMARY OF THE INVENTION

An energy absorber for a bus seat includes a hexagonally shaped pin which interengages both a hexagonally shaped aperture in a bus seat back and hexagonally shaped aperture in a support for the seat. Alternatively, a pentagonally shaped, heptagonally shaped or octagonally shaped pin may be used. The terms "pin, torsion member and fastener" are used synonymously and interchangeably herein. The hexagonal pin resides in the hexagonal apertures of the support and the bus seat back preventing rotation of the bus seat back with respect to the support. The pin is preferably hollow and is made of Aluminum and the supports and seat backs are made of a polymeric material or a material known as a plastic composite. Under forceful impact applied to the bus seat back, the bus seat's rotation will be limited in the direction of the force causing deformation of both the pin and the polymeric material (or plastic composite). A plastic composite is a combination of a polymer and a material such as a fiber which gives the plastic more strength. The deformation of the pin (torsional member) under forceful impact is a plastic deformation. When this limited rotation occurs, the polymeric material (or plastic composite) of the seat back and/or that of the support is deformed by the forceful rotation of the Aluminum hexagonally shaped pin (torsional member). Depending on the characteristics of the Aluminum pin, it may also deform during the forceful rotation of the seat back with respect to the support. Other pin materials may be used such as other metals and/or any one of a wide variety of polymeric materials may be used. The pins which are sometimes referred to herein as fasteners may also be made of a combination of metal and polymeric material or just a polymeric material. Preferably, the seat back and the support are made of a thermoplastic material. However, thermoset materials may be used as the materials for the seat back and the support.

Each school bus seat has two energy absorbers. One of the energy absorbers is on the aisle side of the seat back and operates between the seat back and aisle leg or support. The other energy absorber is on the window side of the seat back and operates between the seat back and the window side support. The energy absorbers are used as a part of the school bus seat.

The bus seat includes an aisle support having a hexagonally shaped aperture or cavity and a window side support having a hexagonally shaped aperture or cavity. A bottom substrate or seat is hinged to the aisle support and the window support. The bus seat includes a seat back having a hexagonally shaped apertures or cavities. A hexagonally shaped pin or torsion member interengages the hexagonally shaped aperture or cavity of the aisle support and one of the hexagonally shaped apertures or cavities of the seat back. Another hexagonally shaped pin or torsion member interengages the hexagonally shaped aperture or cavity of the window side support and the other hexagonally shaped aperture or cavity of the seat back. The hexagonally shaped pins or torsion members in combination with the apertures prohibit rotation of the seat back with respect to the aisle and window side supports unless a forceful load as described above is applied. Preferably, the seat back and supports are made of a polymeric material. The hexagonally shaped cavities are manufactured without significant knit lines formed as the flowability of fiber reinforced polymeric material is enhanced.

Torsion members or pins may be used in polygon shape including a pentagonal, heptagonal, or octagonal cross-sectional shape. The pentagonal, heptagonal or octagonal torsion members are preferably hollow and may be manufactured from a variety of metals and plastics. The bus seat includes a seat back and aisle and window supports having correspondingly shaped apertures or cavities so as to receive the torsion members.

An envelope style bus seat back cushion may be employed over a plurality of seat back configurations. The envelope style bus seat back cushion fits like a sleeve over the seat back. The seat back is inserted into the pocket or cavity in the center of the envelope style bus seat back cushion. The pocket in the center of the envelope style bus seat back cushion is created in the hinged mold by a center core insert or tongue. The envelope style bus seat back cushion may be attached and further secured to the seat back using an adhesive, velcro, staples, or a clamp.

The seat back may comprise a substrate which is solid throughout made from composite thermoplastic or thermoset polymers. Alternatively, the seat back may be made from a reinforced substantially hollow sandwich composite. The sandwich composites may include two polyurethane composite planar surfaces separated by a core material. When sandwich composites are used they may be bolted, adhesively bonded, or ultrasonically welded to the brackets.

Alternatively, it is within the scope of this invention to use a solid reinforced polymer seat back supported by the seat back brackets.

A school bus seat comprises a pin having a cross-sectional shape selected from the group consisting of a pentagon, a hexagon, a heptagon, and an octagon. First and second brackets include an aperture selected correspondingly from the group consisting of a pentagon, a hexagon, a heptagon and an octagon. First and second supports include an aperture selected correspondingly from the group consisting of a pentagon, a hexagon, a heptagon, and an octagon. The apertures in the brackets and supports are formed in a fiber reinforced polymer such that the apertures are devoid of knit lines. The pins reside in the apertures of the supports and brackets inhibiting rotation of the brackets with respect to the supports. A seat back is secured to the brackets.

Two components of the school bus seat, namely, the seat bottom and the seat back can be manufactured by adhering an elastomeric skinned foam directly to a substrate. A mold is first coated by spraying an elastomer skin on the interior thereof. Next, the seat bottom or the seat back is inserted into the mold and positioned and held properly by devices which are not described herein. Then, a polyurethane foam is blown into the cavity between the seat bottom or the seat back and the elastomeric coated mold. The seat bottom or seat back may be a solid reinforced polymer. Alternatively, the seat bottom or the seat back may be a sandwich composite formed by two spaced apart polyurethane substrates separated by and affixed to a low density core.

The elastomer skin foam is sprayed on the interior of the mold surface. A polyurethane foam is blown into the cavity to form the cushion. In both materials, a polyol resin is mixed with an isocyanate to produce a polyurethane. Alternatively, a polyurethane system can be used that is self-skinning.

The polyurethane elastomer skin can be provided by using BASF Elastoskin® S 52220 Spray Aromatic Urethane Elastomer Skin For Non-Automotive Seating Applications. The resin used to form this material is noted on the data sheet provided its manufacturer to have a water content of less than 0.05%, a viscosity of 1100 centipoise, and a specific gravity of 1.033 at 25° C. The isocyanate is also noted on the data sheet to have a viscosity of 700 centipoise and specific gravity of 1.212 at 25° C.

The polyol and isocyanate are mixed in a ratio an index of 102 with 100 parts by mass of polyol to 45.5 parts by mass of isocyanate. The polyol and isocyanate are mixed together to form an elastomer. The polyol and isocyanate are mixed by hand or in a machine. By hand, the mixer speed is 3100 RPM at a temperature of 25° C. In a machine mix, the processing conditions can be determined based on the final production equipment. In one machine mix embodiment, the temperature of chemicals is in the range of 55-75° C. with chemical pressures greater than or equal to 70 bar and the throughput is 15-30 grams/sec.

The polyurethane spray identified above may be used to form an elastomer skin has been noted on the data sheet to have the following properties: nominal skin thickness 0.9-1.2 mm, density 1.03 g/cm$^3$, Shore A Hardness of 58, Tensile Strength 1001 psi, Elongation 263%, Tear Strength 93 lb/in, and puncture resistance of 271 ppi. Further, the Cold Temperature Resistance was reported at −40° by testing a sample with a ¼" mandrel. The sample was found to have no cracks. Additionally, this skin was found to demonstrate durability based on the following physical properties obtained under the indicated environmental testing conditions: heat aged tensile of 1069 psi at 194° F. for 500 hours and a humid aged tensile of 1126 psi at 176° F. for 164 hours with 100% RH. Additionally, the heat aged elongation was 250% at 194° F. for 500 hours and the Humid Aged Elongation was 341% at 176° F. for 164 hours with 100% RH.

According to the manufacturing product data sheet, the urethane spray aromatic urethane elastomer skin provides a flexible, water resistant covering for seats in place of leather and vinyl. This provides a simpler method of application and assembly than leather and vinyl. Further, the aromatic structure found in this system provides high physical properties and softness. Additionally, a light stable in-mold coating is recommended to be used in combination with this spray elastomer. The coating provides UV protection and readily forms multi-tone surfaces.

Polyurethane foam blown into the mold to form a low density is preferably Elastoflex 2684R®/Elastoflex 26850T® from Urethane Specialties BASF Corporation. According to data provided by BASF, this MDI (methylene bis-phenylisocyanate (diphenylmethane diisocyanate)) based flexible foam system is designed for pour behind cover stock and molded seating. The polyol resin is combined in a ratio of 100 parts by weight to 48 parts by weight isocyanate at an index of 100. The polyol has a viscosity of 1275 centipoise at 77° F. and the isocyanate has a viscosity of 33 centipoise at 77° F. The polyol and isocyanate are mixed together resulting in a polyurethane foam. The resulting foam has a free rise density of 3.10 lbs./ft$^3$. With a hand mix, the foam has a gel time of approximately 55 seconds, a rise time of approximately 70 seconds, and a top of cup time of approximately 35 seconds. The foam is typically processed with the polyol and the isocyanate in the temperature range of 70-90° F. with a mold temperature of 90-140° F., a demold time of 3-4 minutes, and a molded density in the range of 2.5-4.0 lbs./ft$^3$.

According to the BASF data sheet, the Elastoflex 2684R®/Elastoflex 26850T® from Urethane Specialties BASF Corporation was mixed with a ratio of 100 parts by weight polyol to 48 parts by weight isocyanate and has the following physical properties molded density 3.16 pcf, IFD 48, 2.77 sag factor, 19 psi tensile, 130% elongation, 1.2 pli tear, and compression set (%) of 3.13 at 50%, 5.60 at 75%, and a MVSS302 pass rating.

According to the BASF data sheet, the Elastoflex 2684R®/Elastoflex 26850T® from Urethane Specialties BASF Corporation was mixed in a ratio of 100 parts by weight polyol to 42 parts by weight isocyanate and has the following physical properties: molded density 3.15 pcf, IFD 28, 2.8 sag factor, tensile of 15 psi, 120% elongation, tear 1.2 pli, and compression set (%) of 2.84 at 50% and 3.44 at 75%, and a MVSS302 pass rating.

A school bus seat comprising a one-piece twin bucket seat with deformable brackets supporting both sides of the seat is also disclosed and claimed.

A school bus seat comprising a superstructure having vertical left and right side supports for supporting a seat back is also disclosed and claimed. Each of the side supports includes a fuse and the fuses are inelastically deformable upon the application of force to the superstructure.

A school bus seat comprising a one-piece twin bucket seat having left and right sides thereof is also disclosed and claimed. The bucket seats include a seat bottom portion and a seat back portion. The seat bottom and back portions are primarily isotropic glass. A first strip of directionalized glass and a second strip of directionalized glass are embedded within the seats proximate the left and right sides thereof and extend from the seat bottom portion to the seat top portion. Upon impact the directionalized glass strips are inelastically deformable.

A method of manufacturing a seat back to be used in a school bus seat is also disclosed and claimed. The interior of the mold is first coated with a spray elastomer. As mentioned above this spray elastomer may be urethane elastomer skin such as BASF Elastoskin® S 52220 Spray Aromatic Urethane Elastomer Skin For Non-Automotive Seating Applications. Next, the superstructure of the seat back is attached to the seat back brackets and the seat back and a portion of the seat back brackets is inserted into the mold. Urethane is then injected into the mold and the urethane adheres to the superstructure of the seat back. This urethane injected into the mold may be a different urethane system than used to comprise the skin. The urethane may be the Elastoflex 2684R®/Elastoflex 26850T®from Urethane Specialties BASF Corporation described previously or another polyurethane foam system.

A method for manufacturing an envelope style bus seat back cushion is disclosed and claimed herein. Specifically, the method includes the step of opening a hinged mold wherein the hinged mold includes first and second sides each having a cavity therein. The sides include interengaging faces, ridges and recesses which substantially seal the sides of the mold. However, there is an aperture in the hinged mold which communicates with the mold cavity and in which the core insert is place and the urethane foam is injected. This aperture is open to the atmosphere.

Before the first and second sides of the mold are closed, the cavities of the first and second sides of the hinged mold are sprayed with an elastomer skin. Once the elastomer skin is sprayed onto and into the cavities of each of the first and second sides of the mold, the step of closing the hinged mold and sealing the interengaging faces, ridges and recesses of the hinged mold and forming a mold cavity is performed. Then, the step of injecting a urethane foam into the mold cavity of the closed hinged mold is performed followed by the step of inserting, quickly, a center core insert into the mold cavity of the closed hinged mold. Then, the urethane is allowed to cure and the steps of: removing the center core insert from the mold cavity, opening the first and second sides of the mold cavity, and, removing and demolding the envelope style bus seat back cushion from the mold are performed.

The method for manufacturing an envelope style bus seat back cushion may include the further steps of guiding the center core insert into the mold cavity, restraining the center core insert within the mold cavity, attaching, releasably, Velcro to the center core insert, and, interengaging the Velcro and the urethane foam.

The superstructure of the seat back may comprise a polyurethane composite surface separated by and affixed to a low density core or it may be a solid reinforced polymer. Another component such as a seat bottom may be made from substantially the same process.

It is an object of the present invention to provide energy absorbers in school bus seats enabling the seats to meet or exceed the Federal Motor Vehicle Safety Standard 222.

It is a further object of the present invention to provide a school bus seat having a superstructure which is substantial and durable and still has the ability to absorb energy, both forward or rearward to meet or exceed Federal Motor Vehicle Safety Standard 222.

It is a further object of the present invention to provide a school bus seat having a seat back pinned to supports such that the pins cause deformation of the bus seat back and the supports when large magnitude loads are applied to the school bus seat back.

It is a further object of the present invention to provide a school bus seat having a seat back fastened to supports such that the fasteners are deformed along with the bus seat back and the supports when large magnitude loads are applied to the school bus seat back.

It is a further object of the present invention to provide a school bus seat having an energy absorber which includes a hollow hexagonally shaped torsion member.

It is a further object of the present invention to provide a school bus seat having an envelope style seat back cushion which is molded from polyurethane and elastomers and/or then is over sprayed with an elastomeric polymer spray to reduce surface imperfections.

It is a further object of the present invention to provide a geometry for the apertures in the seat back such that their flowability is improved reducing the probability of knit lines.

It is a further object of the present invention to provide a seat back or seat bottom made of a solid reinforced polymer having urethane affixed directly thereto with an elastomeric coating over the urethane.

It is a further object of the present invention to provide a seat back or seat bottom made of a sandwich composite having urethane affixed directly thereto with an elastomeric coating over the urethane.

It is a further object of the present invention to mold an envelope style bus seat back cushion using an open hinge mold and a center core insert.

It is a further object of the present invention to mold an envelope style bus seat back cushion using a center core insert.

It is a further object of the present invention to fit the envelope style bus seat back cushion like a sleeve over the seat back.

It is a further object of the present invention to secure the envelope style bus seat back cushion to the seat back using velcro strips where velcro strips are molded into the seat back and cushion.

It is a further object of the present invention provide an envelope style bus seat back cushion by spraying a mold with an elastomer skin coating, injecting a urethane, providing a center core insert to form a pocket for the urethane to surround, removing the center core insert, and demolding an envelope style bus seat back cushion with an elastomer skin coating.

A better understanding of these and other objects will be had when reference is made to the Brief Description Of The Drawings and the Description Of The Invention which follow hereinbelow.

BRIEF DESCRIPTION OF THE DRAWINGS

FIG. 2 is a side view of the aisle support.

FIG. 2A is a front view of the aisle support of FIG. 2.

FIG. 2B is a top view of the aisle support of FIG. 2.

FIG. 2C is a side view of another embodiment of an aisle leg or support illustrating a head portion having a cavity therein and an aperture therethrough.

FIG. 2D is a cross sectional view taken along the lines 2D-2D of FIG. 2C illustrating the head portion thereof having a cavity therein and an aperture therethrough.

FIG. 5 is a top view of the seat.

FIG. 5A is a front view of the seat base.

FIG. 5B is a left side view of the seat base.

FIG. 6 is a front view of the superstructure of the seat illustrating the aisle support, the window side support, the seat, and the seat back.

FIG. 6A is a side view taken along the lines 6A-6A of FIG. 6.

FIG. 6B is a cross-sectional view taken along the lines 6B-6B of FIG. 6.

FIG. 6C is an enlarged view of a portion of FIG. 6 illustrating the hinging of the seat to the aisle support.

FIG. 11D is a cross-sectional view illustrating an octagonal pin.

FIG. 11E is an enlargement of the bottom portion of FIG. 11A.

FIG. 12 is a perspective view of one of the brackets illustrated in FIG. 11.

FIG. 12A is a side view of one of the brackets illustrated in FIG. 11.

FIG. 12B is a front view of one of the brackets illustrated in FIG. 11.

FIG. 17E is an exploded perspective view of the hinged mold in the closed upright position with urethane formed in the mold and the center core insert pulled from the cushion revealing a pocket.

FIG. 17F is a perspective view of the hinged mold in the open position removing the envelope style bus seat back cushion from the hinged mold.

FIG. 17G is an exploded perspective view of the hinged mold in the closed upright position with a guide located on the top of the hinged mold and the center core insert located above the hinged mold.

FIG. 17H is a perspective view of the hinged mold in the closed upright position with the guide on the top of the hinged mold and the lower portion of the center core insert placed into the mold and the upper portion of the center core insert resting on the guide.

A better understanding of the drawings will be had when reference is made to the Description Of The Invention and Claims which follow hereinbelow.

DESCRIPTION OF THE INVENTION

Figures 1, 1A, 1B:
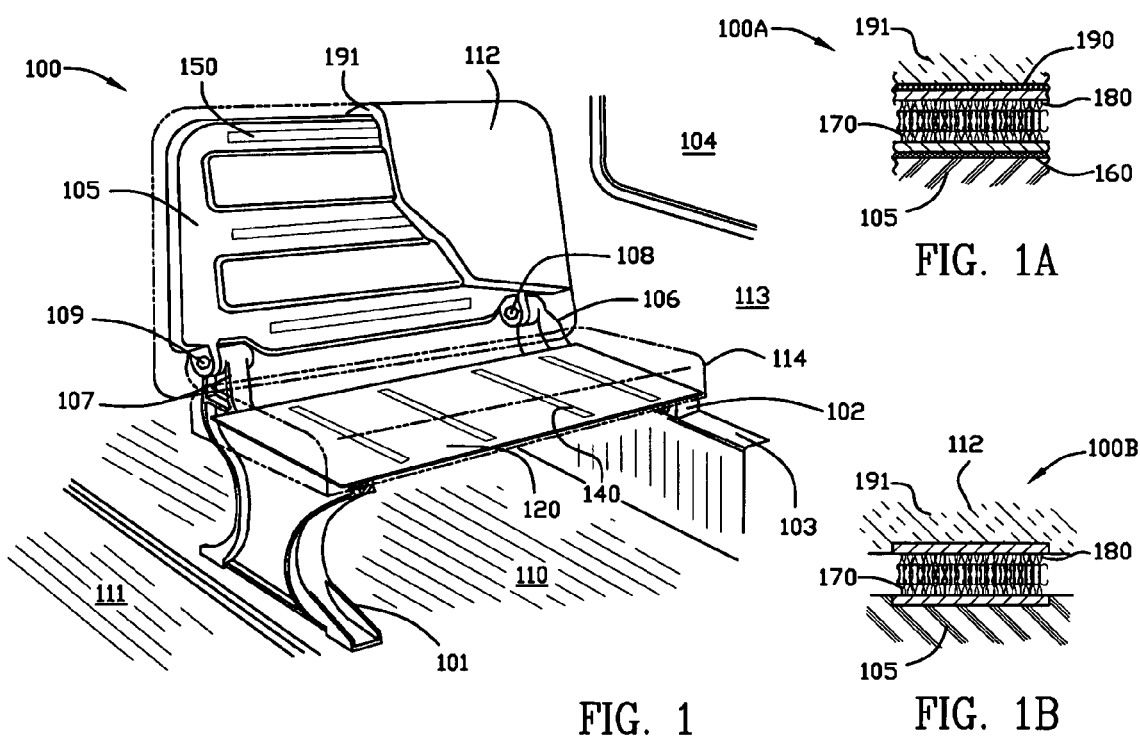
FIG. 1 is a perspective view of the front of the bus seat.
FIG. 1A is a schematic of the Velcro securement of seat cushions to a polymeric substrate or component such as a seat back or a seat.
FIG. 1B is a schematic of the Velcro securement of cushions molded to plastic or polymeric substrates or components such as a seat back or a seat.

FIG. 1 is a perspective view 100 of the front of the bus seat positioned in a bus. Aisle 111 and bus window 104 are illustrated in FIG. 1. Seat base or support 120 is hingedly affixed to aisle leg or support 101 and window leg or support 102. The floor beneath the bus seat is denoted by reference numeral 110, the side of the bus is denoted by reference numeral 113, and the window side rail 103 sits beneath support 102.

Aisle support 101 includes a fastener portion 107 which is fastened to seat back 105 by hexagonally shaped pin 109. Window side support 102 includes a fastener portion 106 which is fastened to seat back 105 by hexagonally shaped pin 108. Aisle support 101 is affixed to the floor and window support 102 is affixed to the window side rail 103. Preferably the supports are thermoplastic materials (or plastic composite materials) which are fastened to the floor with staple items of commerce such as nuts and bolts. Preferably the seat 120 and seat back 105 are thermoplastic materials or plastic composite materials.

Still referring to FIG. 1, reference numeral 112 is an envelope style bus seat back cushion which is affixed to the seat back 105 through the use of Velcro®, which is believed to be a registered trademark of Velcro Industries, B. V. of the Netherlands. Referring to FIG. 1A, a schematic 100A of the usage of Velcro to affix the cushion to the seat back and seat bottom, adhesive 160 is applied to the polymeric substrate such as the seat back 105. Velcro 170 is thus affixed to the bus seat back 105. Similarly, Velcro is also affixed to the polyurethane foam 191 of seat back cushion 112 by adhesive 190. When the respective strips of Velcro interengage, the seat back cushion is securely affixed to the seat back. Removal and replacement of the envelope style seat back cushion is facilitated by this attachment structure and method.

Still referring to FIG. 1, strips 150 of Velcro may be strategically placed on the seat back 105 so as to ensure a tight and snug fit of the seat back cushion. Similarly, Velcro strips 140 may be placed on the seat 120 to secure the seat cushion 114 to the seat 120. FIG. 1B is a schematic 100B of the Velcro securement of a seat cushion to a polymeric or polymeric substrate or component such as a seat back or a seat wherein the Velcro has been molded to the substrate and to the cushion. FIG. 1B illustrates the Velcro strips 170, 180 molded into the back support 105 and the cushion 112.

FIG. 2 is a side view 200 of the aisle support 101 illustrating a bottom 204 and a top 202. Aperture 213, which is located generally in the frontal hinge portion of the aisle support 101, cooperates with a bolt or pivot 507 as best shown in FIG. 6A to enable seat 120 to be rotated in a clockwise direction to enable cleaning of the seat. Bottom 204 of the aisle support 101 is fastened to the floor of the school bus as illustrated in FIG. 1. Those skilled in the art will recognize that there are many techniques for fastening or securing the aisle support 101 to the floor of the school bus. For instance, it may be bolted, strapped, screwed, or fused to the floor of the school bus.

Referring still to FIG. 2, the central portion 230 of the school bus seat is thinner in cross section than the feet illustrated by reference numerals 203, 205 and 206. Having broad feet, 203, 206, adds stability to the seat structure. Reference numeral 201 illustrates a rim portion slightly wider than the foot portion 203. This can be viewed in FIG. 2A, which is a front view 200A of the aisle support 101 of FIGS. 1 and 2.

FIG. 2B is a top view 200B of the aisle support 101 of FIGS. 1 and 2. Referring to FIGS. 2, 2A and 2B, aperture 208 is illustrated in head portion 207. In FIG. 2, the aperture 208 is illustrated as hexagonally shaped in cross section and aperture 208 extends the length of head portion 207. In other words aperture 208 extends through the head portion 207. A neck portion defined by rims 209 and 210 are illustrated in FIGS. 2, 2A and 2B and this neck portion supports the head portion 207. It will be noted that head portion 207 includes a flat portion 211 which allows clearance with respect to reciprocally flat shaped portion 420 of the seat back as illustrated in FIG. 6. Additionally, these reciprocal flat portions also limit the degree of rotational movement of the seat back with respect to the aisle support 101 upon forceful impact to the seat. Forceful impact is that impact which would occur in accident conditions and is defined in Federal Motor Vehicle Safety Standard 222.

FIG. 2C is a side view 200C of another embodiment of an aisle leg or support illustrating a head portion 207 having a hexagonally shaped cavity 291 therein and an aperture or bore 295 therethrough. FIG. 2D is a cross sectional view 200D taken along the lines 2D-2D of FIG. 2C illustrating the head portion 207 thereof having a hexagonally shaped cavity 291 therein and an aperture or bore 295 therethrough. It will be noted that the cavity does not extend through the head 207, rather, it terminates in a substantially flat face 290. Cavity 291 is sometimes referred to herein as the first cavity. First cavity 291 is hexagonally shaped and it is shaped this way so as to eliminate knit lines which are formed when composites are made with abrupt surfaces configurations.

Figure 3A:
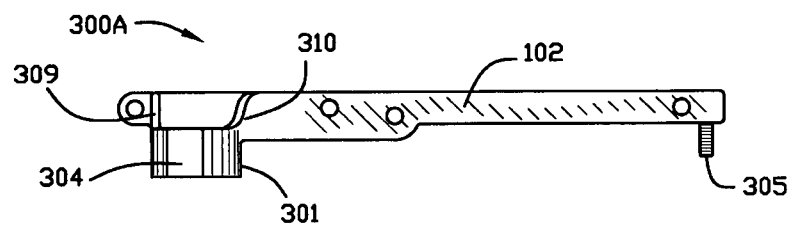
FIG. 3A is a top side view of the window side support of FIG. 3.
Figure 3B:
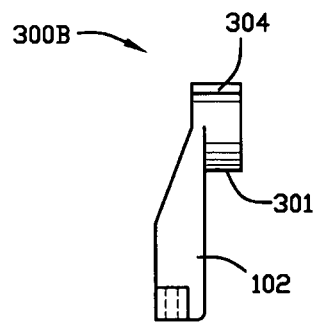
FIG. 3B is a rear view of the window side support of FIG. 3.
Figure 3:
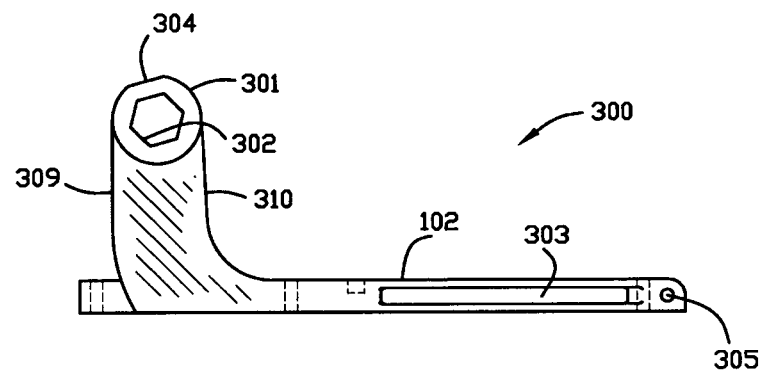
FIG. 3 is a side view of the window side support.

FIG. 3 is a side view 300 of the window side support 102. Apertures illustrated in the window side support enabling affixation to the school bus side rail 103. The window side rail may be affixed to the bus side rail 103 as described above. Referring still to FIG. 3, a neck portion defined by reference numerals 309, 310 supports head portion 301. Head portion 301 includes a hexagonally shaped in cross section aperture 302 which extends the length of the head. In other words, the aperture 302 extends through the head portion 301. Similar to flat portion 211 of head 207 of the aisle leg, a flat portion 304 cooperates with flat portion 425 of the seat back to limit the rotational movement of the seat with respect to the window support 102.

Referring to FIG. 3, reference numeral 303 illustrates a molded cavity in the window support 102.

FIG. 3A is a top side view 300A of the window side support of FIG. 3. FIG. 3B is a rear view 300B of the window side support of FIG. 3. Referring to FIGS. 3 and 3A, bolt 305 is illustrated in an unnumbered aperture. The head of the bolt is not shown and is molded as part of the window support 102. Bolt 305 extends through side support 102 and passes through aperture 512. See FIGS. 5A and 6B.

Figure 3D:
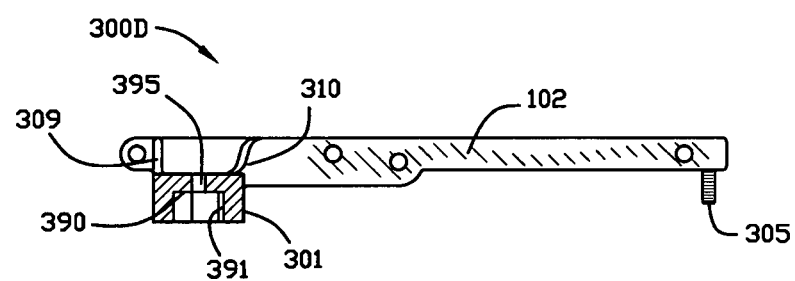
FIG. 3D is a cross sectional view taken along the lines 3D-3D of FIG. 3C illustrating the head portion thereof having a cavity therein and an aperture therethrough.
Figure 3C:
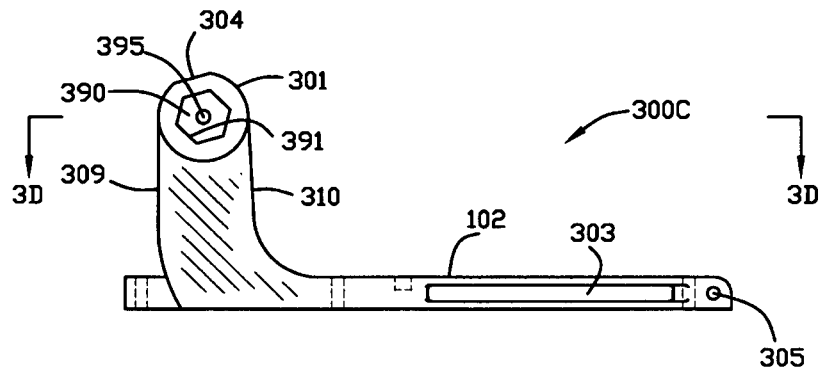
FIG. 3C is a side view of another embodiment of a window side support illustrating the head portion thereof having a cavity therein and an aperture therethrough.

FIG. 3C is a side view 300C of another embodiment of a window support illustrating the head portion 301 thereof having a second hexagonally shaped cavity 391 therein and an aperture or bore 395 therethrough. Cavity 391 terminates in a substantially flat face 390. FIG. 3D is a cross sectional view 300D taken along the lines 3D-3D of FIG. 3C illustrating the head portion 301 thereof having cavity 391 therein and an aperture 395 therethrough. Cavities 391 and 291, previously described above, receive hexagonally shaped pins or torsion members as will be described below.

Figures 4, 4A, 4B:
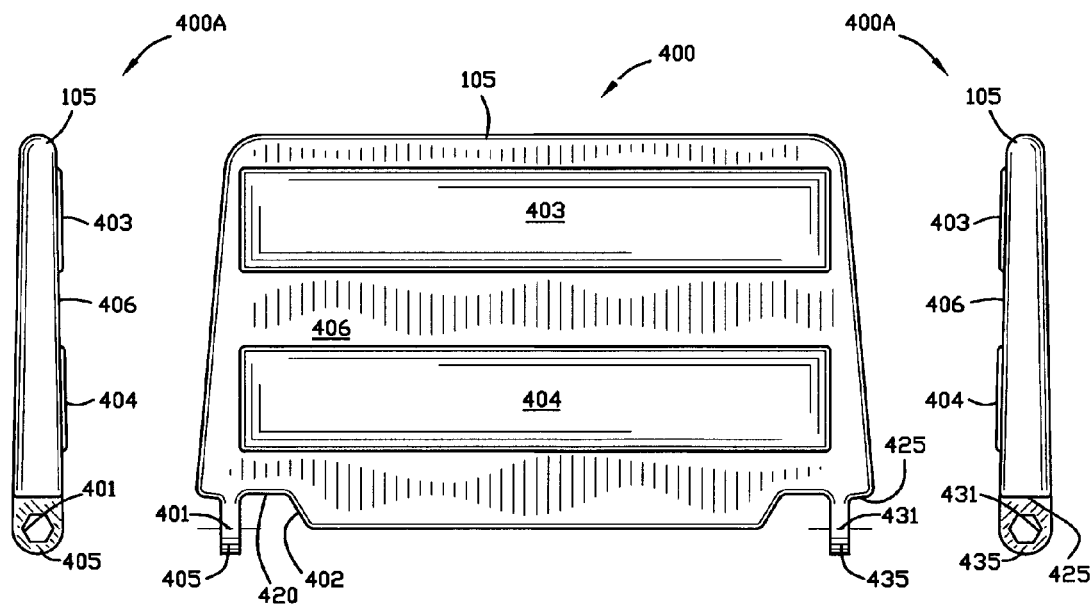
FIG. 4 is a front view of the seat back.
FIG. 4A is a left side view of the seat back.
FIG. 4B is a right side view of the seat back.

FIG. 4 is a front view 400 of the seat back 105 illustrating protrusions 403, 404 and land 406 on the front side thereof. Referring to FIG. 4A, a left side view 400A of the seat back, coupling head portions 405 and 435 are illustrated. Apertures 401, 431 of coupling heads 405, 435 are hexagonally shaped and extend the length of the head portions 405, 435 of the seat back 105. Apertures 401, 431 align with the apertures 208, 302 of head portions 207, 301 of the aisle support 101 and window support 102, respectively. Hexagonally shaped pins 109, 108 are inserted through the aforementioned apertures so as to make a tight fit. The pins may be slightly oversized necessitating a slight pressure to push them through the respective apertures during assembly of the seat. For molding the respective heads, it has been found that a hexagonal shape is practical and works well and improves the flowability of fiber reinforced polymers.

FIG. 4B is a right side view 400B of FIG. 4. Referring again to FIGS. 4 and 4B, flat surface 425 corresponds to flat surface 304 on window support 102. It will be noticed from FIGS. 1 and 6 that coupling head 435 is located interiorly with respect to head portion 301 while coupling head 405 is located exteriorly with respect to head portion 207. This orientation is being illustrated by way of example only and those skilled in the art will readily recognize that the coupling head 425 could also be located exteriorly with respect to head 301 of the window support. In other words coupling head 425 could be located closer or adjacent to the side of the bus wall 113. Further, those skilled in the art will readily recognize that both couplings heads could be located interiorly with respect to the head portions of the supports.

Figure 4C:
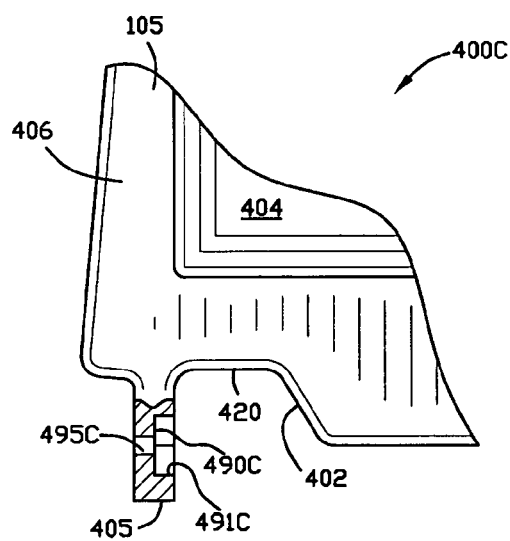
FIG. 4C is a front view of the seat back illustrating the left coupling head in cross section.
Figure 9:
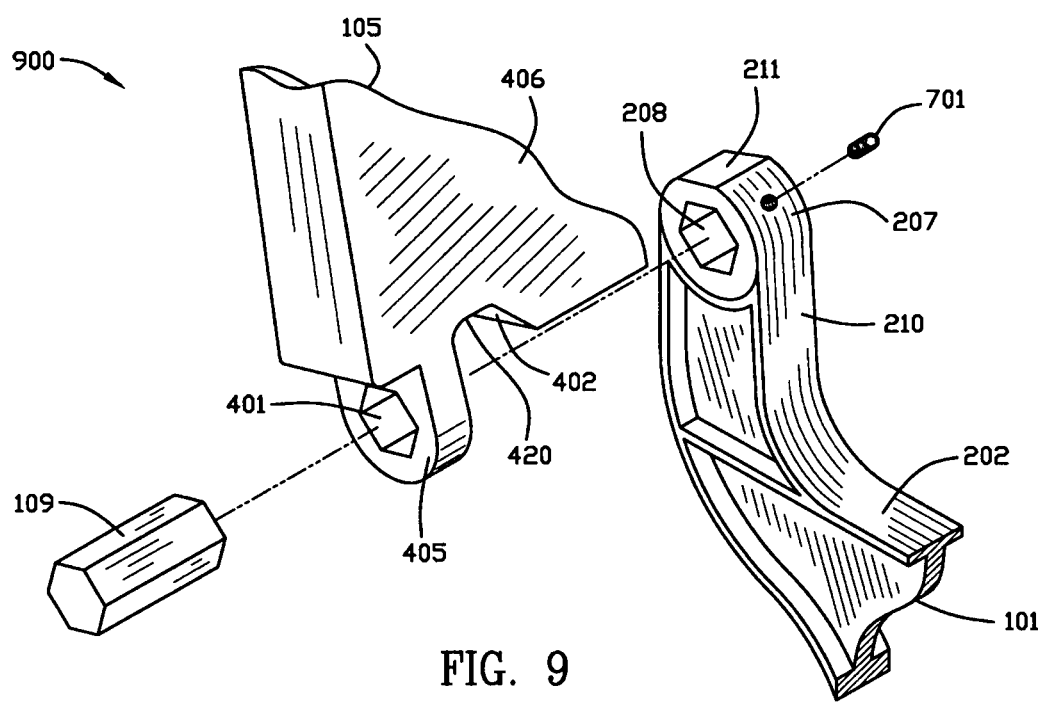
FIG. 9 is an assembly view of the aisle side energy absorber illustrating the hexagonally shaped pin, the aperture in the seat back, and the aperture in the aisle support.

FIG. 4C is a front view 400C of the seat back 105 illustrating the left coupling head 405 in cross section. Cavity 491C, sometimes referred to herein as third cavity 491C terminates in substantially flat face 490C. Bore or aperture 495C extends through head 405. Third cavity 491C faces first cavity 291. See FIGS. 7D and 7E. FIG. 7D is an enlarged cut-away front view 700D of a hollow hexagonal torsion member 777 positioned within the first 291 and third 491C cavities of head portion 207 of the aisle leg support and the coupling head portion 405 of the seat back 105 with a threaded rod 772 and nuts 773, 774 securing the torsional member 777 in place. Torsional member 777 is hexagonally shaped and hollow. Alternatively, torsional member 777 may be shaped so as to provide an aperture therethrough just large enough for rod 772 to pass therethrough. The preferred embodiment of torsional member 777 includes a hexagonally shaped in cross section aperture 771 therethrough. FIG. 9 A illustrates the torsional member 777 and its hexagonally shaped aperture 771 which extends therethrough. Torsional member 777 may be slightly oversized such that its outer hexagonal perimeter exceeds the perimeter of the hexagonally shaped first and second cavities. In other words, the cross sectional area of the torsional member is larger than the cross sectional areas of the first and second cavities. In this instance, the torsional member may have to be forcefully urged into the first and second cavities.

Figure 4D:
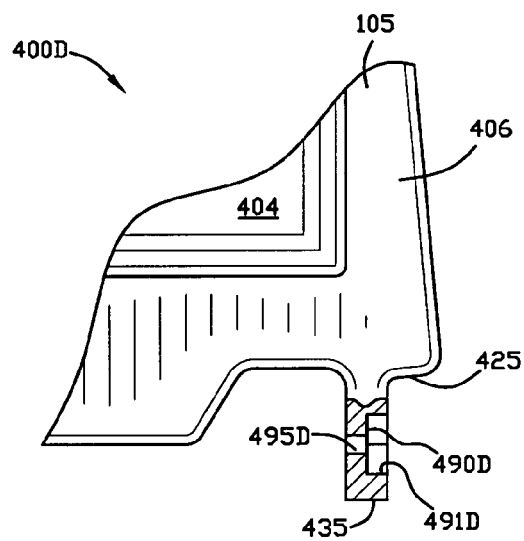
FIG. 4D is a front view of the seat back illustrating the right coupling head in cross section.

FIG. 4D is a front view 400D of the seat back 105 illustrating the right coupling head 435 in cross section. Fourth cavity 491D terminates in substantially flat face 490D. Aperture or bore 495D extends through coupling head 435 enabling the securement of torsional member 777 between the coupling head 435 and the head portion 301 of the window support as illustrated by way of example in FIGS. 7D and 7E. Fourth cavity 491D is in facing relationship to second cavity 391.

FIG. 5 is a top view 500 of the seat 120. Surface 510 is a polymeric planar surface supported by latitudinal ribs 501, 502, 503 and 504. Longitudinal ribs 507A, 507B, 506A and 506B also support the surface 510. Hinge 511 of seat 120 coacts with the frontal hinge portion of the aisle support 101. Hinge 511 includes aperture 507 therein and is aligned with aperture 213 in the frontal hinge portion of the aisle support 101. See, FIG. 6A. Hinge 508 includes aperture 512 therein and includes bolt 305 as illustrated in FIGS. 6 and 6B. FIG. 5A is a front view 500A of the seat base 120 and FIG. 5B is left side view 500B of the seat base.

FIG. 6 is a front view 600 of the superstructure of the seat illustrating the aisle support 101, the window side support 102, the seat 120 and the seat back 105. Just the superstructure of the bus seat is illustrated in FIG. 6. Cushions 112, 114 are illustrated in phantom in FIGS. 6A and 6B.

FIG. 6A is a side view 600A taken along the lines 6A-6A of FIG. 6 illustrating the aisle support 101 and the seat hinge. FIG. 6B is a cross-sectional view 600B taken along the lines 6B-6B of FIG. 6 illustrating the window support 102 and the seat hinge. The seat 120 hinges forward to rotate in a clockwise direction to enable cleaning beneath the seat. Protrusions in the seat 120 mate with corresponding unnumbered apertures in the aisle and window supports. This adds stability to the seat and helps to keep it in place. The protrusions in the bottom of the seat may be oversized with respect to the mating apertures in the supports so as to provide an interference fit.

Figure 9A:
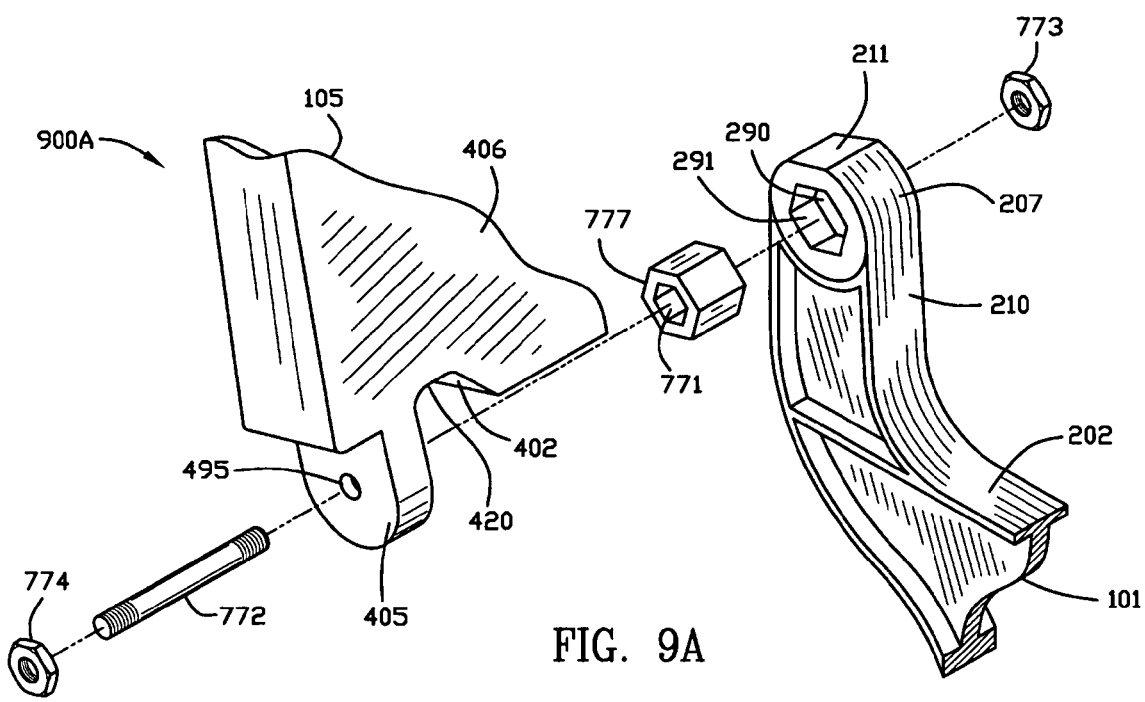
FIG. 9A is an assembly view of the aisle side energy absorber illustrating a hollow hexagonally shaped pin, the threaded rod, and the cavity in the aisle support leg.

FIG. 6A provides a view of the pin 109 residing partially in aperture 401. When a force of sufficient magnitude is applied to the seat back 105, it tends to cause rotation of the seat in the direction of the force. For instance, if the force is applied from the rear of the seat toward the front of the seat, the seat back 105 is urged to be rotated in a clockwise direction against the fasteners or pins 109, 108. If the force is applied from the front of the seat toward the rear of the seat, the seat back 105 is urged to be rotated in a counterclockwise direction against the fasteners or pins 109, 108. In any event, if the seat back 105 is rotated relative to the aisle support, the polymeric material surrounding the pin will be deformed by the pin. Additionally, the pins, although manufactured of metal, will also be deformed depending on their hardness and the hardness of the polymeric material. FIG. 6B provides a view of the pin 108 residing partially in aperture 431. Depending on the geometry of the pin or torsion member, the deformation of the torsion member is controlled. The size and material of the pin are factors as well as the geometry (i.e., a hollow hexagonal geometry as illustrated in FIG. 9A).

FIG. 6C is an enlarged view of a portion of FIG. 6 illustrating in greater detail the hinging of the seat to the aisle support.

Figure 7:
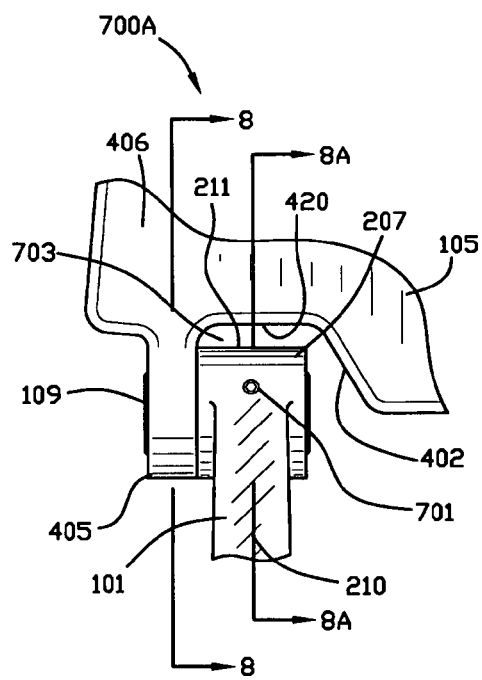
FIG. 7 is an enlarged front view of one of the energy absorbers illustrating a set screw in the neck portion of the aisle support as well as portions of the seat back.

FIG. 7 is an enlarged front view 700 of one of the energy absorbers illustrating a set screw 701 in the neck portion 210 of the aisle support 101 as well as portions of the seat back 105. Set screw 701 secures pin 109 in place within the respective apertures of the seat back and the head of the aisle support. Further, as explained above, flat portion 211 of head 207 of the aisle support, if mounted closely enough to flat portion 420 of the seat back 105, will minimize gap 703 and result in support of the flat portions upon the rotational movement of the seat back with respect to the aisle support. As mentioned hereinabove, the pin 109 may be oversized with respect to the apertures in which it resides. As such, the installation of the pins may require pressure or force to force fit the pin into its respective aperture.

Figure 7A:
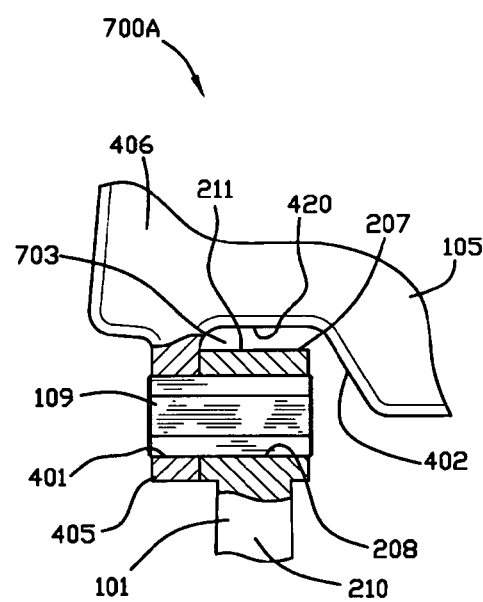
FIG. 7A is an enlarged cut-away front view of the energy absorber of FIG. 7.
Figure 7B:
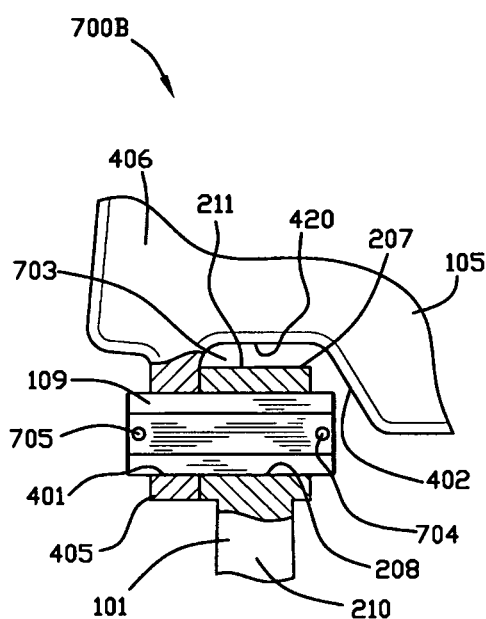
FIG. 7B is an enlarged cut-away front view of the energy absorber of FIG. 7 illustrating pin holes and pins for securing the hexagonal pin in place.

FIG. 7A is an enlarged cut-away front view 700A of the energy absorber of FIG. 7. FIG. 7B is an enlarged cut-away front view 700B of the energy absorber of FIG. 7 illustrating pin holes and pins 704, 705 securing pin 109 in place. With both pins in place the pin 109 cannot move in either the leftward or the rightward direction.

Figure 7C:
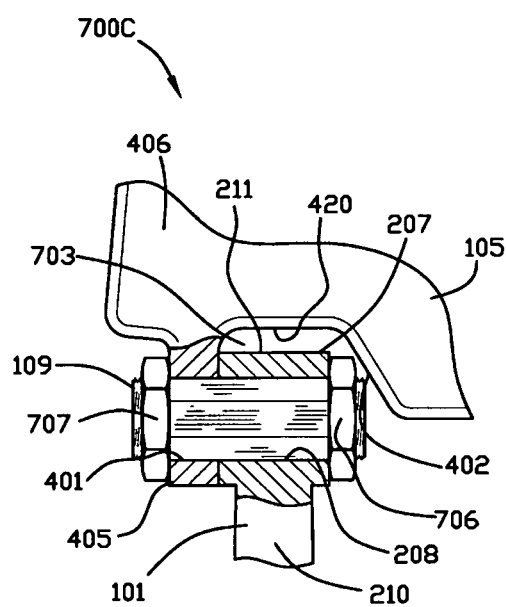
FIG. 7C is an enlarged cut-away front view of the energy absorber illustrating a threaded pin and nuts for securing the pin in place.
Figure 7D:
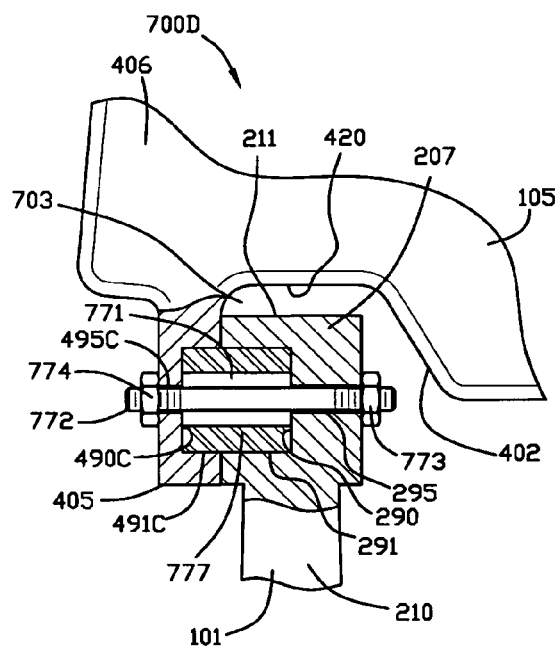
FIG. 7D is an enlarged cut-away front view of a hollow hexagonal torsion member positioned within cavities of the head portion of the aisle leg support and the coupling head of the seat back with a threaded rod and nuts securing the torsional member in place.

FIG. 7C is an enlarged cut-away front view 700C of the energy absorber illustrating a threaded pin and nuts 706, 707 for securing the pin 109 in place. In this embodiment nut 706 would be threaded onto pin 109 as pin 109 is urged rightwardly so as to accommodate for the clearance between head 207 of the aisle support and the back seat 105.

Figure 7E:
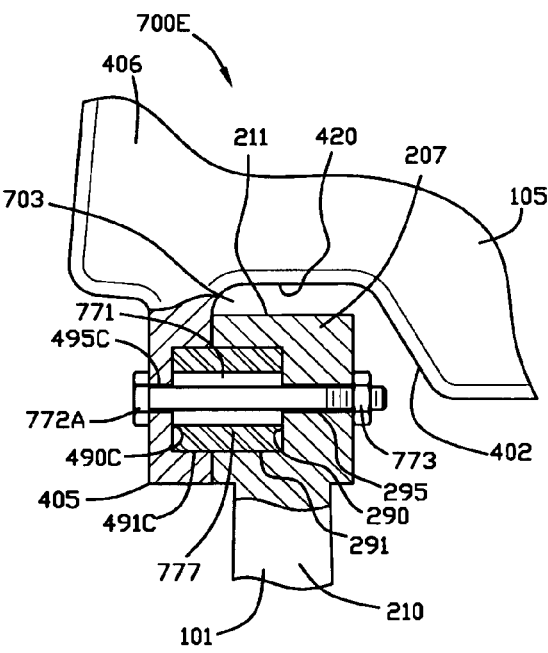
FIG. 7E is an enlarged cut-away front view of a hollow hexagonal torsion member positioned with cavities of the head portion of the aisle leg support and the coupling head of the seat back with a bolt and a threaded rod securing the torsional member in place.

FIG. 7E is an enlarged cut-away front view 700E of a hollow hexagonal torsion member 777 positioned within the cavities 491C, 291 of the head portion 207 of the aisle leg support 101 and the coupling head 405 of the seat back 105 with a bolt 772A, a threaded rod 772 extending from the bolt, and a nut 773 securing the torsional member 777 in place.

Figure 8:
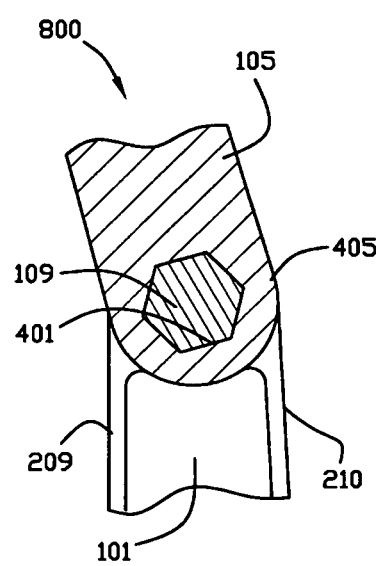
FIG. 8 is a cross-sectional view taken along the lines 8-8 of FIG. 7 illustrating the energy absorber.
Figure 8A:
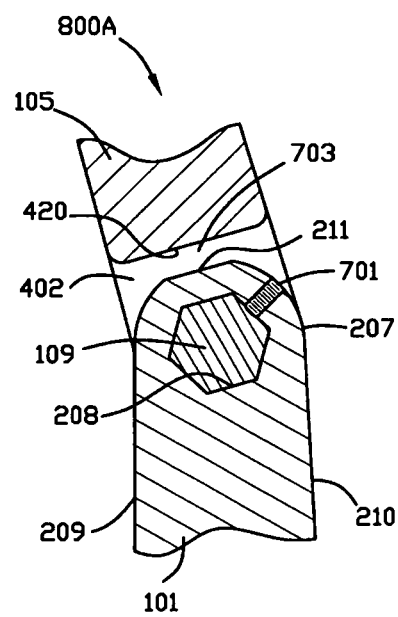
FIG. 8A is a cross-sectional view taken along the lines 8A-8A of FIG. 7.

FIG. 8 is a cross-sectional view 800 taken along the lines 8-8 of FIG. 7 illustrating the hexagonally shaped pin in cross section. Hexagonally shaped pins and apertures are used as it has been found practical to mold hexagonally shaped apertures. As the number of the sides of the apertures increase the moldability of the polymeric material increases. FIG. 8A is a cross-sectional view 800A taken along the lines 8A-8A of FIG. 7 illustrating pin 109 in aperture 208 and set screw 701 securing pin 109 in place.

FIG. 9 is an assembly view 900 of the aisle side energy absorber illustrating the hexagonally shaped pin 109, the aperture 401 in the seat back 105, the aperture 208 in the aisle support 101, and the threaded set screw 701 in the aisle support.

FIG. 9A is an assembly view 900A of the aisle side energy absorber illustrating a hollow hexagonally shaped pin or torsional member 777, threaded rod 772, and the cavity 291 in the aisle support leg 101. Hexagonally shaped torsional member 777, if slightly oversized, will have to be forcefully urged into hexagonal cavity 291 and hexagonal aperture 491C.

Figure 10:
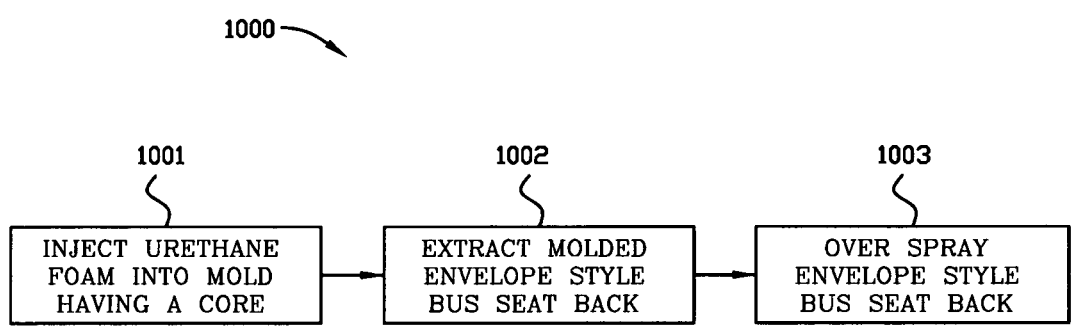
FIG. 10 is a schematic diagram illustrating the steps for producing an envelope style bus seat.

FIG. 10 is a schematic diagram 1000 illustrating the steps for producing an envelope style bus seat. First, the proper mold having a core must be utilized in order for the envelope to be created. If desired, Velcro may be molded directly into the foam which is injected 1001 into the mold having a core. After the foam has been formed into an envelope shape, it is extracted 1002 from the mold. Next, the extracted foam is over sprayed with an elastomeric spray to remove the imperfections from the foam. In this way a seat is formed having a smooth contour without holes in its surface. Holes are sometimes caused in making foam parts by the off gassing of the urethane.

Although thermoplastics are preferred for the supports, seat back and seat, thermoset materials may be used as well. Aluminum is preferred for the pins or fasteners but other metals or even polymeric materials may be used. The seat pivots or hinges are preferably metal studs and bolts but may be made from polymeric material. Similarly, the seat back is illustrated and described herein as a solid polymeric but other configurations are contemplated by the invention.

Additionally, the polymeric materials used in the invention may be made from fire retardant materials and/or from polymeric materials which will not burn. Some of the structural components used in the invention may be made from light weight metal alloys.

Figures 11, 11A:
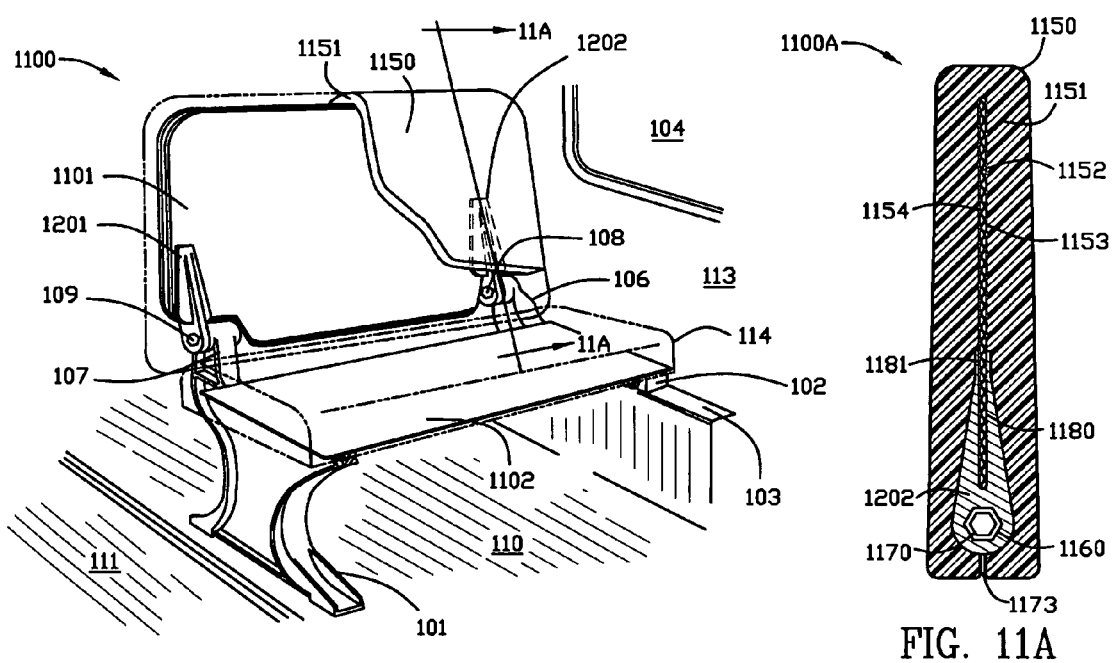
FIG. 11 is a front perspective view of a bus seat employing a sandwich composite with an integrally molded skin applied to the cushion of the seat back and the seat bottom.
FIG. 11A is a cross-sectional view taken along the lines 11A-11A illustrating a hexagonal pin, the seat back cushion and the seat back bracket.

FIG. 11 is a front perspective view 1100 of a bus seat employing a sandwich composite as a seat back 1101 and seat bottom 1102 with an integrally molded skin 1150 integrally affixed to the urethane cushion 1151. The urethane cushion is affixed to the seat back 1101 and the seat bottom 1102. FIG. 11A is a cross-sectional view 1100A taken along the lines 11A-11A illustrating a hexagonal pin 1170 residing in a hexagonal aperture 1160. Seat back bracket 1202 is illustrated in cross section in FIG. 11A. Corrugated core 1152 separates rigid polyurethane plates 1153 and 1154 and is attached thereto. Reference numeral 1173 represents a discontinuity in the cushion so as to enable assembly of the back seat brackets 1201, 1202 to the aisle supports 107, 106, respectively. A slot 1216, best viewed in FIGS. 12 and 12A receives the composite seat back superstructure. Alternatively, slot 1216 may receive a solid reinforced polymer substrate with the cushion affixed thereto. Any of the cushions may be oversprayed with elastomer to ensure homogeneous surface finishes. Reference numerals 1180 and 1181 illustrated in FIG. 11A signify the adhesive attachment of the composite seat back superstructure.

Figure 11B:
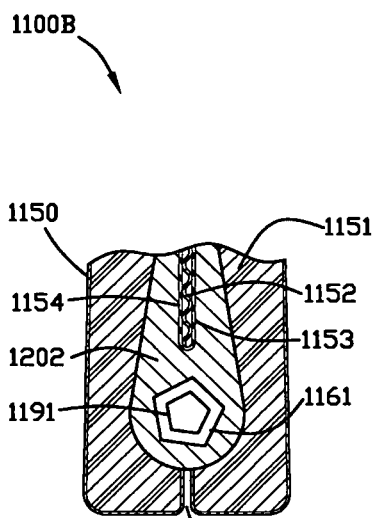
FIG. 11B is a cross-sectional view illustrating a pentagonal pin.
Figure 11C:
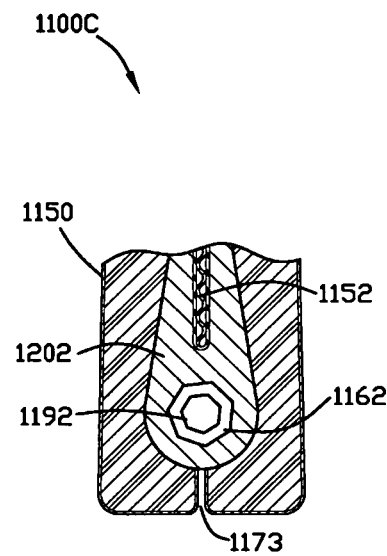
FIG. 11C is a cross-sectional view illustrating a heptagonal pin.

FIG. 11B is a cross-sectional view 1100B illustrating a pentagonal pin 1191 residing in a respective pentagonal aperture 1161 of a back bracket support. FIG. 11C is a cross-sectional view 1100C illustrating a heptagonal pin 1192 residing in a respective pentagonal aperture 1162 of a seat back bracket support. FIG. 11D is a cross-sectional view 1100D illustrating an octagonal pin 1193 residing in a respective pentagonal aperture 1163 of a seat back bracket support. FIG. 11E is an enlargement 1100E of the bottom portion of FIG. 11A illustrating in better detail the composite seat back (1152, 1153 and 1154) residing in the slot 1216 of the seat back bracket. Pins 1191, 1192, and 1193 are preferably hollow but may be solid. Pins 1191, 1192 and 1193 are preferably made of Aluminum but also can be made of an inelastically deformable plastic.

FIG. 12 is a perspective view 1200 of one of the brackets 1202 illustrated in FIG. 11. Each bracket has a front side panel denoted by reference numerals 1211A, 1211B which is generally planar and a rear side panel denoted by reference numerals 1212A, 1212B which is also generally planar. These front and rear panels form slot 1216 and are supported by tapered ridges 1213, 1214 which terminate in a flat outer surface located at the top of bracket 1202 and denoted by reference numeral 1210. Slot 1216 includes a bottom 1217 upon which a substrate rests when assembled as illustrated in FIG. 11. Bracket 1202 includes a bottom portion 1215 as best illustrated in FIG. 12A. An aperture 1160 resides in the bottom portion and it is this aperture which interconnects a hexagonal pin (not shown in FIGS. 12-12B). A pentagonal, heptagonal or octagonal aperture may be used as well as set forth in FIGS. 11B-11D. Preferably, the brackets 1201, 1202 are made from fiber reinforced polymers.

FIG. 12A is a side view 1200A of one of the brackets illustrated in FIG. 11. A threaded bolt 1250 having a head 1251 and a nut 1252 is illustrated in FIG. 12A as an alternate attachment of the composite sandwich or the solid substrate to the bracket. It should be noted that if a solid substrate is used then the bracket may, alternatively, be deleted and the seat back structure can be constructed as set forth in FIG. 1 above. FIG. 12B is a front view 1200B of one of the brackets illustrated in FIG. 11 wherein the bottom 1219 thereof is indicated.

Figure 13:
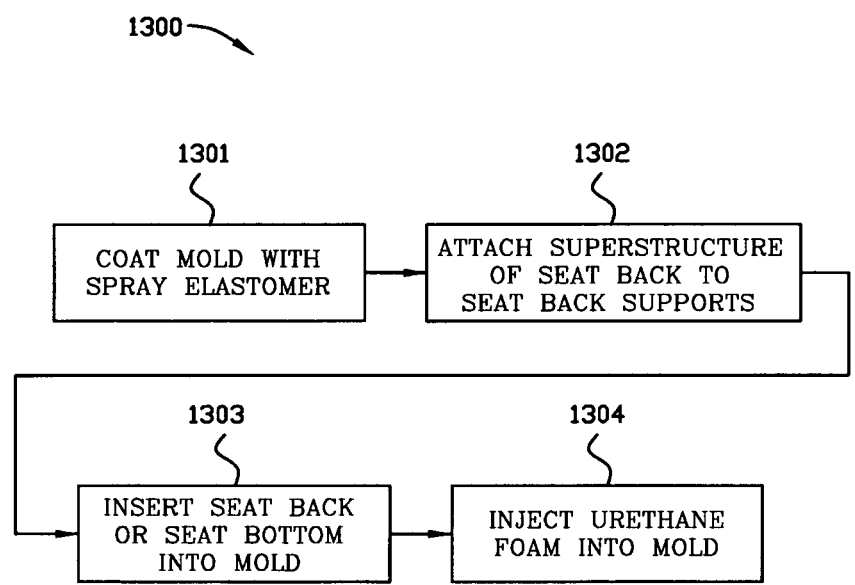
FIG. 13 is a diagram of the process steps of forming an elastomeric skinned foam over a seat back.

FIG. 13 is a diagram 1300 of the process steps of forming an elastomeric skinned foam over a seat back or a seat bottom. The elastomeric skinned foam may be formed over a composite sandwich having two rigid substrates separated by a core or it may be formed over a solid fiber-reinforced substrate. The mold may be made of metal such as aluminum or steel. First, the interior of the mold is coated 1301 with a spray elastomer. Next, the superstructure of the seat back is attached 1302 to the seat back brackets and inserted 1303 into the mold. The mold can be designed so as to accommodate voids therein to permit formation of the elastomeric skinned cushion over just the back brackets. The voids will accommodate the areas where the back brackets attach directly to the aisle or window supports. Some voids are necessary so that the brackets 1201, 1202 may be attached using the pins to the aisle 101 and window 103 supports. Urethane foam is then injected 1304 into the mold forming an elastomeric skinned 1150 cushion 1151 integrally attached to the substrate 1154, 1152. The completed component is then removed from the mold and assembled as part of a bus seat.

Figure 14:
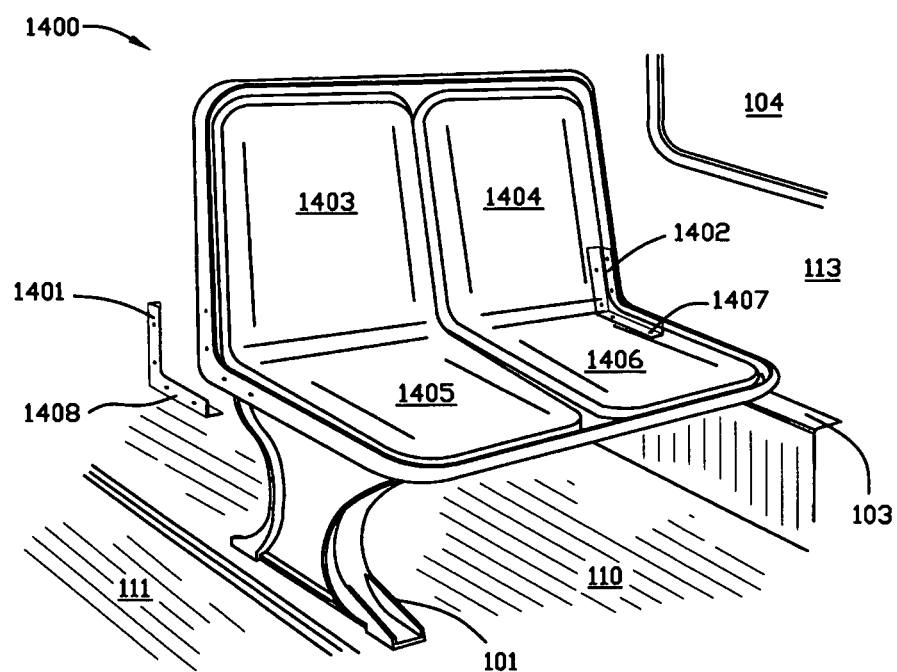
FIG. 14 is a perspective view of a one-piece plastic seat mounted directly onto the aisle support and the window support.

FIG. 14 is a perspective view 1400 of a one-piece plastic seat mounted 1408/1407 directly onto the aisle support 101 and the window support 103. Brackets 1401, 1402 engage the seats and the aisle and window supports. Two seats are provided 1403, 1405 and 1404, 1406. Upper portions 1403 and 1404 of the seats engage bracket portions 1401, 1402. When the upper portions 1403, 1404 of the seats sustain a sufficient impact load from behind, brackets 1401, 1402 inelastically deform and absorb the energy of the impact. Deformable energy absorbing brackets 1401, 1402 are threaded directly into the seats 1405, 1406 and the supports 101, 103. The seats (1405, 1406) and seat backs (1403, 1404) are preferably made of fiber reinforced polymer.

Figure 15:
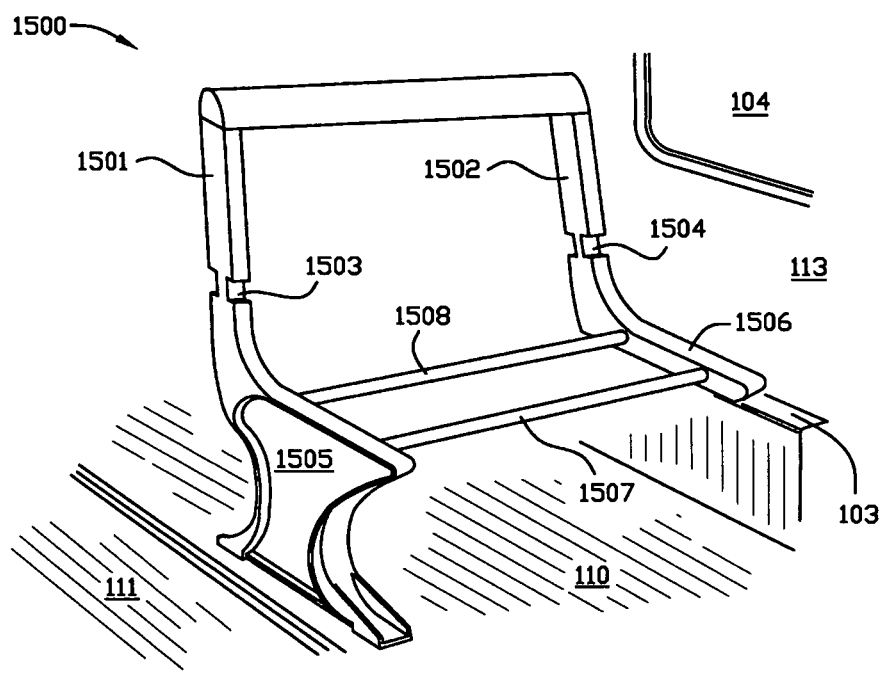
FIG. 15 is a perspective view of a seat frame employing fuses in the rear frame portion thereof for deforming upon impact of the seat back.

FIG. 15 is a perspective view 1500 of a seat frame (1501, 1502, 1505, 1506, 1507, 1508) employing fuses 1503, 1504 in the rear frame portion (1501, 1502) thereof for deforming upon impact of the seat back. Vertical left 1501 and right 1502 side supports for supporting a seat back are deformable upon the application of force to the superstructure. Fuses 1503, 1504 include notches in the front and rear thereof which create weak areas due to reduced cross-sectional area. The seat superstructure as shown in FIG. 15 is preferably made of fiber reinforced polymer.

Figure 16:
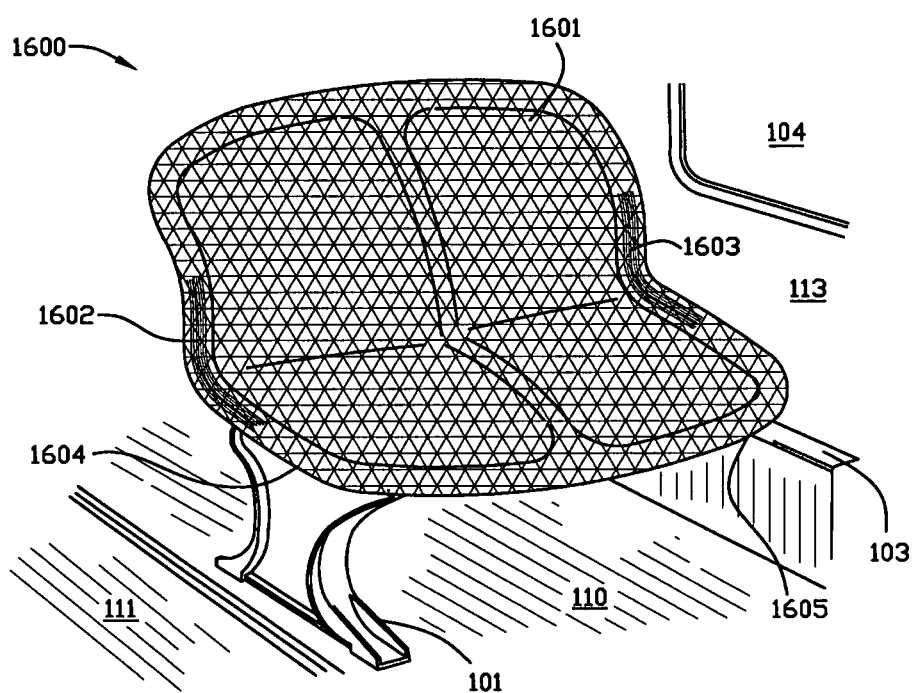
FIG. 16 is a perspective view of seat manufactured from isotropic glass with two directionalized glass mats embedded therein to absorb energy applied to the seat back.

FIG. 16 is a perspective view 1600 of a seat manufactured from isotropic glass 1601 with two directionalized glass mats 1602, 1603 embedded therein to absorb energy applied to the seat back. Directionalized glass mats 1602 and 1603 are 0.145 inches thick. The one-piece school bus seat include seat portions 1604, 1605 secured to the aisle 101 and window 103 supports and seat back portions. Upon sufficient impact from behind, directionalized glass mats 1602, 1603 inelastically deform.

Figure 17:
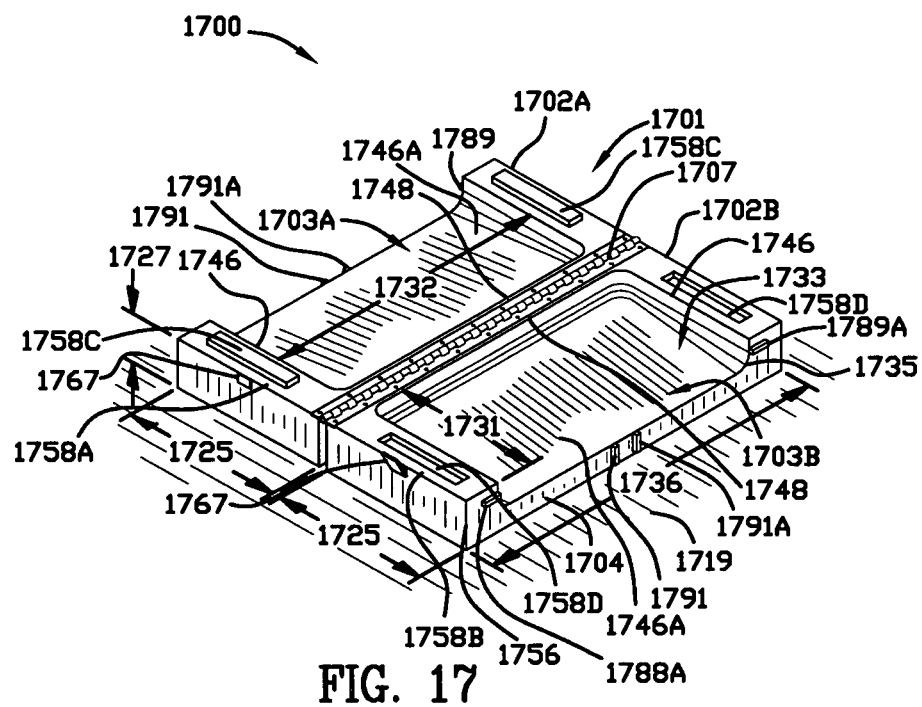
FIG. 17 is a perspective view of a hinged mold in the open position.

FIG. 17 is a perspective view 1700 of the hinged mold 1701 in the open position. The hinged mold 1701 has two sides or halves 1702A, 1702B. Each side or half 1702A, 1702B of the molds is generally rectangularly shaped with a cavity 1703A, 1703B therein. The mold material is aluminum. Each side 1702A, 1702B of the hinged mold 1701 has a cavity 1703A, 1703 B and a top surface 1704. The two sides of the hinged mold 1702A, 1702B are connected by a hinge 1707. Each side 1702A, 1702B of the hinged mold 1701 has a width 1727, a height 1725, and a length 1736. Each side 1702A and 1702B of the hinged mold 1701 has a cavity 1703A and 1703B with a length 1732 and a depth 1731. An aperture 1735 in the mold 1701 is formed when the two halves 1702A, 1702B of the mold are closed. Aperture 1735 is generally centrally located within the closed mold. Side 1746A includes a contoured surface 1733. The top of the mold 1704 has an edge 1756. Part of a latch 1767 is located on each side 1702A, 1702B of the mold. Positioning blocks 1788, 1788A, 1789, 1789A, 1791, and 1791A are located on the top surface 1704 of the hinged mold 1701.

Each side of the mold 1702A and 1702B has inner adjacent surfaces 1758A and 1758 B. Hinge 1707 interconnects the sides of the mold together. When open, the inner adjacent surfaces 1758A, 1758B face upward. The mold in open position may be treated with mold release and other materials and processes, so that the mold is considered prepped. When closed the inner adjacent surfaces interengage each other. A ridge or step 1758C on surface 1758A of mold half 1702A interengages recess 1758D of mold half 1702B when the two halves 1702A, 1702B of the mold are closed.

Figures 17A, 17B:
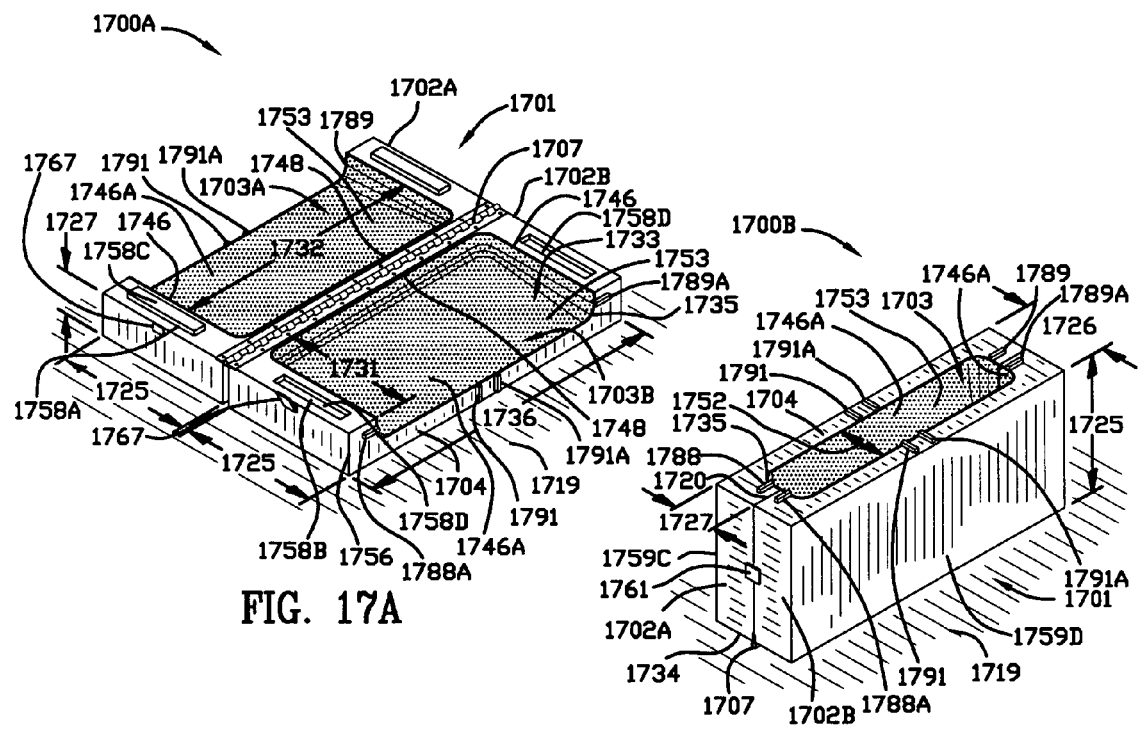
FIG. 17A is a perspective view of the hinged mold in the open position with a elastomer spray coating covering the main cavity.
FIG. 17B is a perspective view of the hinged mold in a closed upright position.

FIG. 17A is a perspective view of the hinged mold 1701 in an open position with a spray elastomer coating 1753 covering both sides of the cavity 1703A, 1703B. Spray elastomer coating such as BASF Elastoskin® S 52220 may be used having the properties identified previously above. The aperture or opening 1735 of the cavity 1703 is separated from the edge 1756 of the mold 1701 of the top surface 1704 by a set distance. Spray elastomer 1753 covers the entire cavity 1703 including cavity bottom 1748 and sides 1746, 1746A.

FIG. 17B is a perspective view 1700B of the hinged mold in the closed upright position. The two sides 1702A and 1702B of the hinged mold are upright with the ridge and recess (not shown) structures interengaging. The seam 1720 is located between the two sides 1702A and 1702B as illustrated in FIG. 17B. Each side 1702A and 1702B as shown extends in a closed, upright position perpendicularly from the resting surface 1719. Each side of the mold 1702A, 1702B has a width 1727. The hinged mold 1701 in the closed upright position has a total width of 1726.

Still referring to FIG. 17B, the top surface 1704 of the mold includes an opening 1735 in communication with cavity 1703. Cavity 1703 is formed when surfaces 1758A, 1758B interengage and is bounded by the cavity bottom 1748 and sides 1746, 1746A of each cavity half 1703A, 1703B. Aperture 1735 has rounded edge which runs contiguously between the two sides 1702A, 1702B of the hinged mold forming one large central opening in the center of the hinged mold. The hinged mold 1701 in the closed upright position has a bottom surface 1734 that rests on a resting surface 1719. Opening 1735 of the cavity 1703 has a width 1752 in the closed position. Inner surfaces 1746, 1746A, 1748 of the cavity are covered with a spray elastomer coating 1753. The mold has a front outer surface 1759D and rear outer surface 1759C. The inner adjacent surfaces 1758A and 1758B face and engage each other in the closed upright position.

The cavity 1703 has one opening or aperture 1735 in the top 1704 of the mold 1701 that runs contiguously between the sides of the mold 1702A, 1702B. The cavity 1703 has a width 1752 with all of the cavity sides 1746, 1746A coated with the spray elastomer 1753.

A variety of molding processes, techniques, and procedures may be used with molds with in a variety of different forms and different cavity configurations. Further, other processes for forming the envelope style bus seat back cushion may be used including extruding, die cutting, foam-in-place, etc.

Figures 17C, 17D:
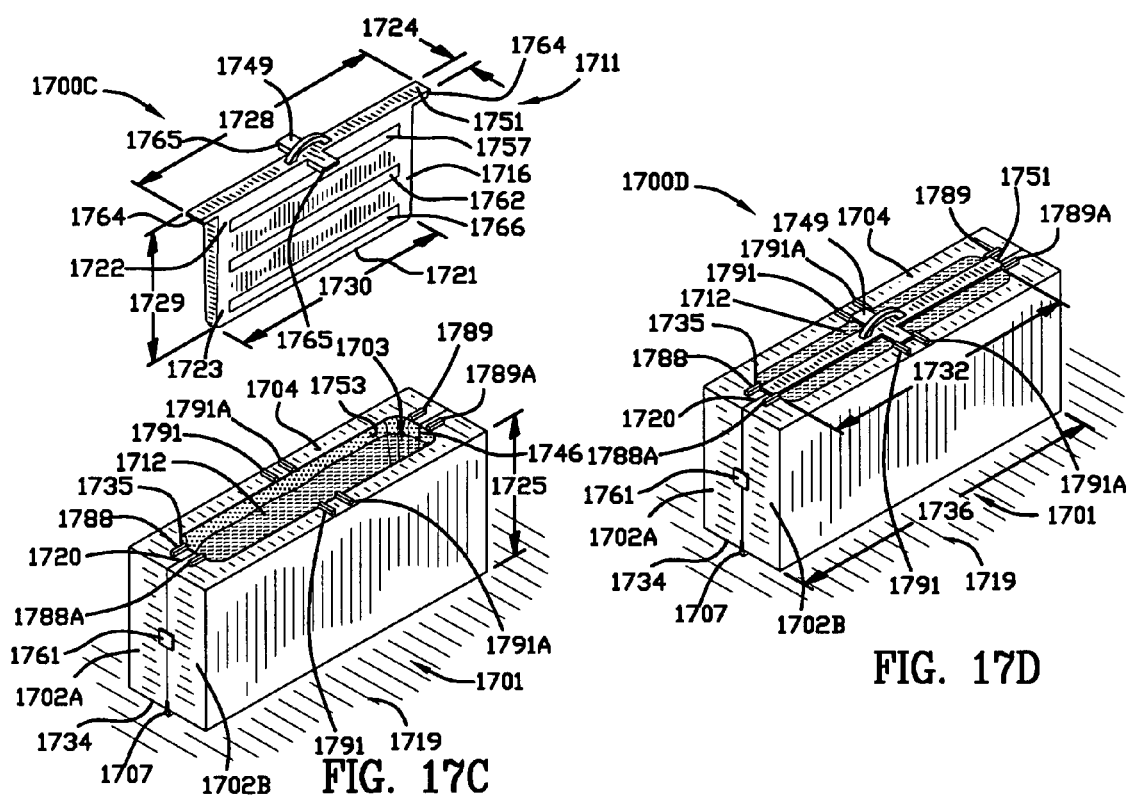
FIG. 17C is an exploded perspective view of the hinged mold in the closed upright position with urethane injected therein and a center core insert located above the hinged mold.
FIG. 17D is a perspective view of the hinged mold in the closed upright position with urethane injected therein and a center core insert placed therein.

FIG. 17C is an exploded perspective view 1700C of the hinged mold 1701 in the closed upright position with material 1712 injected therein and a center core insert 1711 positioned for insertion into the mold 1701. The material is preferably a polyurethane material which can be inserted in a liquid form that may expand and cure into a solid after being injected into the cavity of the mold. The hinged mold 1701 includes top surface 1704 with an opening 1735 communicating with cavity 1703. Opening or aperture 1735 is centrally positioned in the top surface 1704. Liquid material 1712 is injected into the cavity 1703 just below the top surface 1704 of the mold 1703. The mold 1703 has a latch 1761 which can be used to secure the mold 1701 in a locked, closed position.

The material may be a urethane liquid which cures to form a solid foam while in the mold. The urethane foam is preferably the BASF Elastoflex 2684R®/Elastoflex 26850T® described hereinabove. The material 1712 first spreads throughout the cavity 1703 typically as a flowing liquid. The interior 1746, 1746A, 1748 of the cavity contacted by the material 1712 is covered by the spray elastomer 1753. The material 1712 that is injected as a liquid begins curing into a solid while in direct contact with the spray elastomer 1753 coating on the sides of the cavity. Further, other materials and processes for forming a cushion in addition to polyurethane and polyurethane molding may be used.

Material 1712 is injected in the cavity and as is able to completely fill the bottom portion 1748 of the cavity and is able to flow across the bottom of the mold as a liquid. The material 1712 will form a solid and as it does its viscosity increases and its ability to flow to fill the corners of the mold will be decreased. In order to make a complete high quality part, all areas of the cavity must be completely filled before the liquid material cures as a solid. A lack of material in corners of the mold or the deepest parts of the cavity will lead to gaps, weaknesses, or defects in the final part. To ensure the cavity is properly filled with material, the deepest parts of the cavity including the bottom of the cavity and the lower corners are able to be filled by first injecting the material as a liquid. As the material begins to form into a solid, it will be less likely to move away from these hard to reach areas of the mold. As illustrated in FIGS. 17A-D, with one large main cavity, there are no difficult or hard to fill areas. The cavity 1703 as defined by the sides 1746, 1746A and bottom 1748 does not include sharp projections or definitions and, as such, the injected or poured urethane consistently yields a usable part.

Still referring to FIG. 17C, a center core insert 1711 is positioned above and is ready to be placed into the cavity 1703. The center core insert 1711 has a width 1724, a length 1728 of an upper portion, a lower portion 1723, a length along a lower portion 1730, a bottom portion 1721, a height 1729, and a surface 1716 with a pattern for securing the cushion 1713 to the seat back. The center core insert 1711 may include velcro strips 1757, 1762, 1766 which are attached to the pocket of the envelope style cushion during the molding process. The velcro strips 1757, 1762, 1766 may be taped or removably attached through other means to the center core insert which does not have strong attachment enabling the separation of the velcro from the insert 1711 when the insert 1711 is extracted from the mold 1703. The pocket 1714 of the envelope style cushion 1713 is the interior space or volume formed when the center core insert 1711 is removed. Additionally, the upper portion 1722 of the center core insert 1711 has a width support guide 1749.

The height 1729 of the center core insert 1711 is less than the depth 1731 of the cavity 1703 of the hinged mold when in closed position. The length support guide 1751 of the center core insert 1711 has 1728 length that is greater than the lower portion 1723 of the center core insert 1711. Additionally, the length 1732 of the cavity 1703 is less than the length support guide 1751 enabling the guide to maintain the center core insert 1711 sufficiently above the bottom 1748 of the mold. The center core insert 1711 includes a length support guide 1751 and a width guide 1749 to prevent the center core insert 1711 from falling into the cavity 1703 and position the center core insert 1711 with respect to the cavity 1703.

The length support guide 1751 is longer than the opening 1735 of the cavity 1703 and the width guide 1749 is wider than the opening 1735 of the cavity 1703 so as to control the depth of insertion of the core insert 1711. Additionally, the length 1730 of the lower portion of the center core insert and the height 1729 of the center core insert 1711 are less than the respective length 1732 of the corresponding aperture 1735 and depth 1731 of the cavity 1703.

The center core insert 1711 has raised edges, notch or a lip 1764, 1765 on the ends of the width support guide 1749 and the length support guide 1751 which helps secure the center core insert 1711 at the desired position in the aperture 1735 of the cavity 1703. The lips 1764, 1765 engage the edge of the aperture 1735 of the cavity 1703 to fit securely in position.

Center core inserts of different shape can be used to facilitate fitting the envelope style cushion to different shaped seat backs. In particular, a center core insert 1711 can be used to shape the pocket 1714 of the envelope style cushion 1713 to fit a ¾" hollow tube composite seat frame. A center core insert 1711 can be used shaped to form cushions to fit a variety of different seat back or seat frames. The dimensions and contour of the center core insert can be modified to fit to a specific seat back or seat frame design. See FIG. 17H which illustrates the envelope cushion 1713.

FIG. 17D is a perspective view 1700D of the hinged mold 1701 in the closed upright position with material 1712 injected therein and a center core insert 1711 placed therein. The center core insert 1711 is illustrated in the middle of the cavity 1703. The length support guide 1751 and width support guide 1749 of the center core insert 1711 are shown engaging the top surface 1704 of the hinged mold. The length support guide 1751 is placed between the longitudinal blocks 1788, 1788A and 1789, 1789A so as to ensure that the length support guide 1751 and the center core insert 1711 do not move. The width guide 1749 is placed between the transverse blocks 1790, 1790A and 1791, 1791A to ensure that the width guide 1749 and the center core insert 1711 do not move.

Once the center core insert 1711 is placed in the cavity 1703, the material 1712 is pushed close to the top surface 1704 of the cavity 1703 due to displacement of the material by the center core insert 1711. The center core insert 1711 assists in pressing the material 1712 against the sides of the cavity 1703 and increases the level of the material 1712 in the cavity 1703. Material 1712 is in a liquid form and is molded into shape between the sides 1746, 1746A, and bottom 1748 of the cavity 1703 and the center core insert 1711. Center core insert 1711 displaces urethane material from the center of the cavity 1703. The center core insert forms a pocket 1714 out of the material 1712 as illustrated in FIG. 17H.

The center core insert 1711 increases the level of material 1712 in the cavity close to the aperture 1735 of the cavity 1703. The center core insert 1711 acts as a plunger increasing the efferent flow of the material to the sides of the mold reducing the occurrence of gaps or voids in the material 1712 and the resulting envelope style cushion 1713.

FIG. 17E is an exploded perspective view 1700E of the hinged mold 1701 in the closed upright position with the center core insert 1711 removed from the material 1712 in the cavity revealing a pocket 1714. The center core insert 1711 has been removed from the cured flexible style cushion 1713 formed in the cavity 1703 of the hinged mold. The cavity 1703 holds a cured material 1747 and is ready to be demolded once the center core insert 1711 is removed. There are many other materials that can be injected into the cavity as a liquid and removed as a molded solid.

Center core inserts of different shape can be used to facilitate fitting the cushion to different shaped seat backs. Further, the contour of surfaces 1746, 1746A, and 1748 may be contoured differently to form envelope style cushions having different patterns. In particular, a center core insert 1711 can be made to fit a ¾" hollow tube composite seat frame presently in use in school busses. A center core insert 1711 can be used to shape the cushion 1713 to fit to a variety of different seat back or seat frames. The center core insert 1711 can be changed to adjust the pocket 1714 to fit to a specific seat back or seat frame design without changing the mold.

The easy removal of the center core insert 1711 enables a pocket 1714 to be formed in the cushion 1713 quickly without additional expense and complicated mold design or additional process steps.

FIG. 17F is a perspective view 1700F of the hinged mold 1701 in open position separating the envelope style bus seat back cushion 1713 from the hinged mold. In FIG. 17F the open hinge mold 1701 is opened by lowering the sides 1702A, 1702B of the open hinge mold to an open position and removing the envelope style bus seat back cushion 1713 as a solid from the cavity 1703. The pocket 1714 formed in the cushion is an aperture in the open surface 1744 of the envelope style bus seat back cushion and extends downward in the cushion toward the closed curved end 1742 of the envelope style bus seat back cushion 1713. The pocket has a bottom 1754 and interior sides 1755. The pocket 1714 is formed in the shape of the center core insert 1711. The bottom 1754, sides 1755, and shape of the pocket can be adjusted by using a center core insert of different dimensions, shape, or inserting the center core insert 1711 to a different depth or orientation.

The envelope style cushion 1713 has rounded edges 1741 on its open surface 1744. The cushion has a spray elastomer 1753 covering all of its surfaces that were previously in contact with the mold cavity 1703. Different exterior styles and contours of the envelope style seat back cushion may be created by contouring the interior surfaces 1746, 1746A of the mold. The cushion 1713 has a contour 1740 in its surface.

The envelope style cushion 1713 also has a width 1737, height 1738, and a length 1739. These shape characteristics and dimensions are shaped by curing the material injected into the space created between the sides of the cavity 1746, 1746A, 1748, and the center core insert 1711. Different shapes including varying thicknesses and rounded edges can be formed and removed from the mold easily to provide the optimum envelope style bus seat back cushion 1713 for the particular user.

Pocket 1714 is shaped so that it can be easily placed over a bus seat back. Pocket 1714 in the bus seat back 1713 gives rise to the term envelope style bus seat back. Open surface 1744 of the envelope style seat back is formed at the top of the hinged mold 1701. Pocket 1714 has sides 1755 and a bottom 1754. The shape of the pocket 1714 can be formed to fit over a variety of seat backs. The pocket 1714 may be designed to fit over a seat back formed from polymer composite or a steel frame. The shape of the pocket 1714 may fit over a steel frame comprised of ¾" hollow tube. The shape of the pocket 1714 can be changed to accommodate a number of different steel frames by inserting a different center core insert 1711 into the cavity 1703 of the mold 1701.

When placed over the seat back, the surface 1744 of the envelope style bus seat back cushion 1713 will be used near the bottom of the seat back when installed thereover. The envelope style seat back cushion 1713 may be affixed at the bottom of a seat back by velcro, stapling, adhesives, etc. Additionally, the bottom 1743 of the envelope style bus seat back cushion 1713 and the curved end 1742 of the envelope style bus seat back cushion are demolded from near the bottom of cavity 1748. The bottom of the pocket 1754 and the curved end 1742 of the envelope style bus seat back cushion 1713 typically will be located near the top of the seat back when installed thereover. Velcro strips may be molded directly into the seat back and in the cushion 1713 to ensure a secure attachment between the two surfaces. The envelope style seat back cushion 1713 is designed to slide over the seat back fitting like a sleeve or an envelope.

FIG. 17G is an exploded perspective view 1700G of the hinged mold 1701 in the closed upright position with a guide 1715 located on the top of the hinged mold 1701 and the center core insert 1711 positioned above the hinged mold 1701. The guide 1715 is located on the top 1704 of the hinged mold 1701 around the periphery of the opening 1735 of the cavity 1703. The hinged mold 1701 is positioned in an upright position with guide 1715 on its top surface 1704. Lower portion 1723 of center core insert 1711 can be inserted past the guide 1715 and can fit into the cavity 1703.

However, both the width support guide 1749 and the length support guide 1751 have dimensions which are greater than the guide 1715 in both the width and length directions respectively. The guide 1715 does not allow the length support guide 1751 and width support guide 1749 to pass by. The width support guide 1749 and length support guide 1751 rest on top of the guide 1715. The guide 1715 prevents the center core insert 1711 from being inserted too far into the cavity 1703. The guide 1715 can be used to insure that the optimal shape of the pocket 1714 and the proper overall shape of the cushion is formed. The height and location of the guide 1715 can be adjusted to change the depth and the position of the center core insert 1711 in the cavity 1703. Changing the location and placement of the guide 1715 enables the adjustment of the size, shape, and location of the pocket 1714 in the envelope style seat back cushion 1713.

FIG. 17H is a perspective view 1700H of the hinged mold in the closed upright position with a guide on the top of the hinged mold and the center core insert 1711 placed into the mold and resting on the guide 1715. The hinged mold 1701 in the closed upright position has a center core insert 1711 placed into the cavity 1703 with the width and length supports of the center core insert resting on the guide 1715. The guide 1715 is located a distance 1750 from the top 1704 of the hinged closed mold 1701. Guide 1715 is spaced above top surface of mold 1704 and for a given height 1729 of the center core insert 1711 which is less than height 1731 of the mold, then the pocket 1714 must be shifted upwardly.

Consequently, the position of the center core insert 1711 can be verified and adjusted without having to open the mold 1701 or change the design of the mold. By enabling the center core insert 1711 to reach different depths within the cavity 1703, the guide 1715 can form envelope style cushions 1713 with different sized pockets 1714. Further, the guide can be used to ensure that the center core insert is accurately placed in the correct position and that the center core insert is not placed too far into the cavity.

Figure 18:
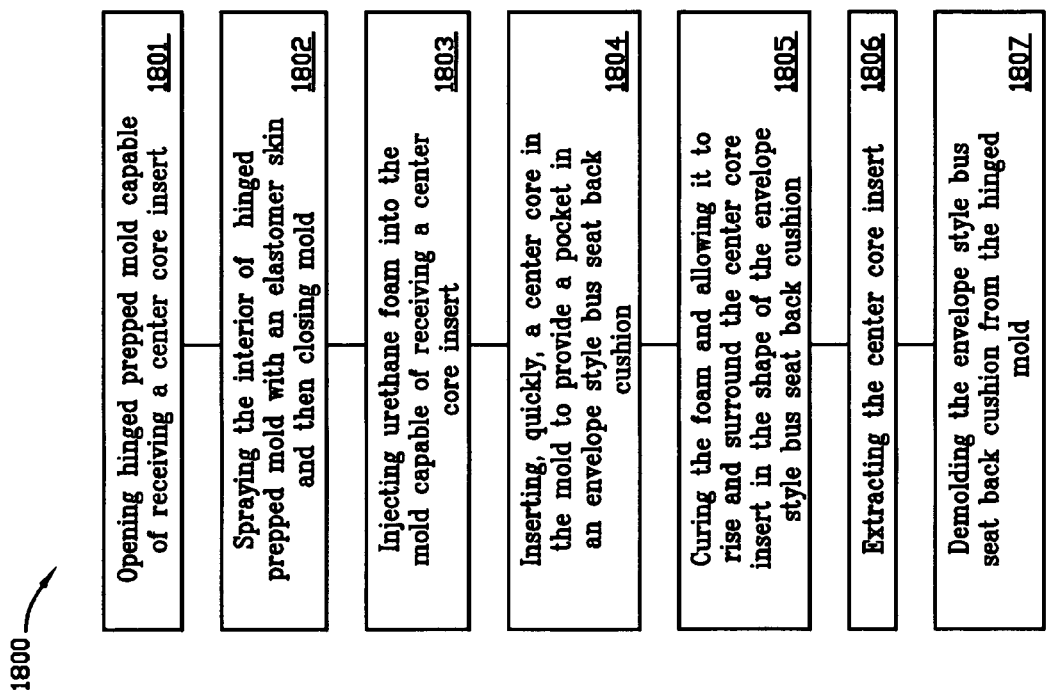
FIG. 18 is a diagram of the process steps of forming an envelope style bus seat back cushion with a hinged mold and a center core insert.

FIG. 18 is a diagram 1800 of the process steps of forming an envelope style bus seat back cushion 1713 with an elastomer skin 1753. First, 1801, a prepped hinged mold capable of receiving a center core insert is opened. Next, the prepped interior of the hinged mold 1701 is sprayed with an elastomer skin 1753, 1802. Material 1712 is injected into the mold 1701 capable of receiving a center core insert 1711, 1803. In the next step, a center core insert 1711 is quickly inserted to provide a pocket 1714 in the envelope style bus seat back cushion 1713, 1804. The material cures and is allowed to expand surrounding the center core insert 1711 in the envelope style bus seat back cushion 1713, 1805. The center core insert 1711 is removed in the following next step, 1806, which allows the envelope style bus seat back cushion 1713 to be demolded from the mold, 1807.

A method for manufacturing an envelope style bus seat back cushion is disclosed and claimed herein. Specifically, the method includes the steps of opening a hinged mold 1701. The hinged mold 1701 has first and second sides each having a cavity therein. The sides include interengaging faces 1758A, 1758B; ridge 1758C; and recess 1758D which substantially seal the sides of the mold 1702A, B. However, there is an aperture 1735 in the hinged mold 1701 in which the center core insert 1711 is place and the material 1712 is injected. This aperture 1735 is open to the atmosphere. Before the first and second sides of the mold are closed, the cavities of the first and second sides 1703A, 1703B of the hinged mold 1701 are sprayed with an elastomer skin 1753. Once the elastomer skin 1753 is sprayed onto and into the cavities of each of the first and second sides 1703A, 1703B of the mold, the step of closing the hinged mold and sealing the interengaging faces, ridges and recesses of the hinged mold and forming a mold cavity is formed. Then, the step of injecting material 1712 such as a urethane foam into the mold cavity of the closed hinged mold is performed followed by the step of inserting, quickly, a center core insert into the mold cavity of the closed hinged mold. Then, the urethane is allowed to cure and the steps of: removing the center core insert from the mold cavity, opening the first and second sides of the mold cavity, and, removing and demolding the envelope style bus seat back cushion from the mold are performed.

The method for manufacturing an envelope style bus seat back cushion may include the further steps of guiding the center core insert into the mold cavity, restraining the inner core insert within the mold cavity, attaching, releasably, Velcro to the center core insert, and, interengaging the Velcro and the urethane foam.

Further, the method for manufacturing an envelope style bus seat back cushion may include use of an elastomer skin which includes a polyol and an isocyanate. This type of elastomeric skin includes the further comprising the steps of: mixing the polyol and the isocyanate in a ratio of 100 parts by weight polyol to 48 parts by weight of the isocyanate and then spraying the elastomer skin into and onto the cavity of the hinged mold. The coating of the cavity of the hinged mold continues until the elastomer skin has a thickness of approximately 0.9 mm. Then a foam urethane is formed by mixing a second polyol and a second isocyanate.

The urethane is then injected into the mold at a temperature in the range of 90-140° F. adhering the urethane to the center core insert and the elastomer skin on the mold. The following step includes removing the urethane from the mold within a demold time of 3-4 minutes, the urethane having a molded density in the range of 2.5-4.0 lbs./ft$^3$.

The method of manufacturing an envelope style bus seat may include a polyol which has a water content of less than 0.05%, a viscosity of approximately 1100 centipoise and a specific gravity of approximately 1.033 at 25° C., and, the isocyanate has a viscosity of 700 centipoise and a specific gravity of 1.212 at 25° C. The elastomer skin has a thickness of 0.9-1.2 mm, density 1.03 g/cm$^3$, a Shore A Hardness of 58, a tensile strength of 1001 psi, an elongation of 263%, a tear strength of 93 lb/in, and a puncture resistance of 271 ppi. The urethane includes the second polyol which has a viscosity of 1275 centipoise at 77° F. and the second isocyanate has a viscosity of 33 centipoise at 77° F. and the urethane has a free rise density of 3.10 lbs/ft$^3$.

Those skilled in the art will recognize that the invention has been set forth by way of examples and that changes may be made to the examples without departing from the spirit and the scope of the attached claims.

List of Reference Numerals

100 perspective view of the front of the bus seat
100A schematic of the usage of Velcro
101 aisle support
102 window side support
103 window side rail, school bus side rail
104 bus window
105 seat back
106 fastener portion (on window side support side)
107 fastener portion (on aisle support side)
108 hexagonally shaped pin (on window side support side)
109 hexagonally shaped pin (on aisle support side)
110 floor beneath bus seat
111 aisle
112 envelope style bus seat back cover, cushion
113 side of the bus wall
114 seat cushion
120 seat
140 velcro strips
160 adhesive
190 adhesive
191 polyurethane foam
200 side view of the aisle support
200A front view of aisle support
200B top view of aisle support
200C side view of an aisle leg or support
200D cross-sectional view along lines 2D-2D of head portion
201 rim portion of school bus seat
202 top of aisle support 203 foot portion of school bus seat
204 bottom of aisle support
205 foot portion of school bus seat
206 foot portion of school bus seat
207 head portion of aisle support
208 aperture of head portion
209 rim of neck portion
210 rim of neck portion
211 flat portion of neck portion
213 aperture
230 central portion of school bus seat
290 flat face of head portion
291 hexagonally shaped cavity, first cavity
295 aperture
300 side view of window side support
300A top side view of window side support
300B rear view of window side support
300C side view of a window support
300D cross sectional view of head portion
301 head portion
302 hexagonally shaped cross-section aperture
303 molded cavity
304 flat portion
305 bolt
309 neck portion
310 neck portion
390 flat face
391 second hexagonally shaped cavity
395 aperture
400 front view of seat back
400B right side view of seat back
400C front view of seat back
401 aperture
403 protrusion
404 protrusion
405 coupling head
406 land
420 reciprocally shaped flat shaped of seat back
425 flat surface
431 aperture
435 coupling head
490C flat face
491C cavity
491D fourth cavity
495C aperture
500B left side view of seat base
500 top view of seat 120
501 latitudinal rib
502 latitudinal rib
503 latitudinal rib
504 latitudinal rib
506A longitudinal ribs
506B longitudinal ribs
507 aperture
507A longitudinal rib
507B longitudinal rib
508 hinge
510 polymeric planar surface
511 hinge
512 aperture
600 front view of superstructure of the seat
600A side view of aisle support and seat hinge
600B cross-sectional view of window side support and seat hinge
700 enlarged front view of energy absorber
700A enlarged cut-away front of FIG. 7
700B enlarged cut-away of energy absorber
700C enlarged cut-away front view of energy absorber
701 set screw
703 gap
706 thread pin
707 threaded nut
771 cross section aperture
772 threaded rod
773, 774 nut
777 torsional member
800 cross-sectional view illustrating hexagonally shaped pin in cross-section
800A cross-sectional view
900A assembly view of the aisle side energy absorber
1000 schematic diagram
1001 process step of injecting urethane foam into mold having a tongue
1002 process step of extracting molded envelope style bus seat back
1003 process step of over spraying envelope style seat back
1100 front perspective view of bus seat
1101 seat back
1102 seat bottom
1150 integrally molded skin
1151 urethane cushion
1152 corrugated core
1153 polyurethane plate
1154 polyurethane plate
1160 hexagonal aperture
1161 pentagonal aperture
1170 hexagonal pin
1173 discontinuity in cushion
1180 adhesive attachment of composite seat back superstructure
1181 adhesive attachment of composite seat back superstructure
1191 pentagonal pin
1192 heptagonal pin
1193 octagonal pin
1201 back seat bracket
1202 back seat bracket
1211A front side panel on bracket
1211B front side panel on bracket
1212A rear side panel on bracket
1212B rear side panel on bracket
1213 tapered ridge
1214 tapered ridge
1215 bracket bottom portion
1216 slot
1217 bottom of slot
1250 threaded bolt
1251 head
1252 nut
1300 diagram of process steps of forming elastomer skin foam over a seat back or seat bottom
1301 process step of coating mold with spray elastomer
1302 process step of attaching superstructure of seat back to seat back supports
1303 process step of inserting seat back or seat bottom into mold
1304 process step of injecting urethane foam into mold
1400 perspective view of a one-piece plastic seat
1401, 1402 bracket portions
1403, 1404 seat backs
1405, 1406 seats
1500 perspective view of a seat frame
1501, 1502 rear frame portion
1503, 1504 fuses 1600 perspective view of a seat
1601 isotropic glass
1602,1603 directionalized glass mats
1604, 1605 seat portions
1700 perspective view of the hinged mold in open position
1700A perspective view of the hinged mold in open position with a spray elastomer skin covering the cavity
1700B perspective view of the hinged mold in closed position with an elastomer skin covering the cavity
1700C perspective view of the hinged mold injected with urethane in a closed position with a center core insert located outside the mold
1700D perspective view of the hinged mold in closed position having center core inserted and material injected into cavity
1700E perspective view of center core insert removed hinged mold and material in cavity
1700F perspective view of envelope style bus seat back cushion removed from hinged mold in open position
1700G perspective view of center core insert above the hinged mold in closed position with a guide on top of mold
1700H perspective view of center core insert inserted in the hinged mold in closed position with a guide on top of mold
1701 the hinged mold
1702 A,B side of the hinged mold (open position)
1703 cavity
1703A,B side of cavity in hinged mold
1704 top of hinged mold (closed position) upright
1707 hinge
1711 center core insert
1712 material injected in mold
1713 envelope style bus seat back cushion
1714 pocket in envelope style bus seat back cushion
1715 guide
1716 surface of center core insert
1719 resting surface
1720 seam
1721 bottom portion of center core insert
1722 upper portion of center core insert
1723 lower portion of center core insert
1724 width of center core insert
1725 height of hinged mold in the closed upright position
1726 width of hinged mold in the closed upright position
1727 width of one side of hinged mold
1728 length of upper portion of center core insert
1729 height of center core insert
1730 length of lower portion of center core insert
1731 height of cavity in hinged mold
1732 length of opening of cavity in hinged mold
1733 contour in cavity of hinged mold
1734 bottom of hinged mold in the closed upright position
1735 aperture
1736 length of hinged mold
1737 width of envelope style bus seat back cushion
1738 height of envelope style bus seat back cushion
1739 length of envelope style bus seat back cushion
1740 contour of envelope style bus seat back cushion
1741 edge of envelope style bus seat back cushion
1742 curved end of envelope style bus seat back cushion
1743 bottom of envelope style bus seat back cushion
1744 open surface of envelope style bus seat back cushion
1746 side of cavity
1746A side of cavity
1747 cured material
1748 bottom of cavity
1749 width support guide of upper portion of center core insert
1750 distance of guide from top of hinged mold
1751 length support guide of upper portion of center core insert
1752 width of cavity
1753 elastomer skin
1754 bottom of pocket
1755 side of pocket
1756 edge of mold
1757 velcro strip
1758A,B inner adjacent surface of sides of mold
1758C ridge
17858D recess
1759C,D outer surface of front and back of mold
1761 latch
1762 velcro strip
1764 lip
1765 lip
1766 velcro strip
1767 latch part
1788, 1788A, 1789, 1789A, 1790, 1790A, 1791, 1791A- positioning blocks
1800 diagram of process steps of forming elastomer skin over a cushion
1801 process step of opening a hinged prepped mold capable of receiving a center core insert
1802 process step of spraying the interior of a hinged prepped mold with an elastomer skin and then closing mold
1803 process step of injecting urethane foam into the mold capable of receiving a center core insert
1804 process step of inserting, quickly, a center core in the mold to provide an inner cavity for an envelope style bus seat back cushion
1805 process step of curing the foam and allowing it to rise and surround the center core insert in the shape of the envelope style bus seat back cushion
1806 process step of extracting the center core insert
1807 process step of demolding the envelope style bus seat back cushion from the hinged mold While the invention has been described herein by way of Example only, those skilled in the art will readily recognize that changes may be made to the invention without departing from the scope of the appended claims.

The invention claimed is:
1. A method for manufacturing an envelope style bus seat back cushion comprising the steps of:
 injecting urethane foam into an envelope style bus seat back cushion mold, said mold having a core to form said envelope style bus seat back cushion, said envelope style bus seat back cushion includes: a front portion and a rear portion; said front portion and said rear portion are connected by a joining portion; said front portion, said rear portion, and said joining portion include a closed upper portion; an open lower portion; and an intermediate portion; said front portion, said rear portion, and said joining portion form said closed upper portion; said open lower portion includes an aperture therein in communication with a pocket formed in said intermediate portion; and said pocket has sides and a bottom reciprocally shaped to slide over a seat back;
 extracting said envelope style bus seat back cushion urethane foam from said mold;
 overspraying said envelope style bus seat back cushion urethane foam externally from said mold with an elastomeric skin to a desired thickness.

2. A method for manufacturing an envelope style bus seat back cushion, comprising the steps of:
 opening a hinged mold, said hinged mold having first and second sides having a cavity in each of said sides, said sides include interengaging faces, ridges and recesses;
 spraying said cavities of said first and second sides of said hinged mold with an elastomer skin;
 closing said hinged mold and sealing said interengaging faces, ridges and recesses of said hinged mold and forming a mold cavity;
 injecting a urethane foam into said mold cavity of said closed hinged mold;
 inserting, quickly, a center core insert into said mold cavity of said closed hinged mold after injecting said urethane foam into said mold cavity of said closed hinged mold;
 curing said urethane foam;
 removing said center core insert from said mold cavity;
 said steps of injecting urethane foam, inserting a center core insert, curing said urethane foam, and removing said center core insert form said envelope style bus seat back cushion;
 opening said first and second sides of said mold cavity; and,
 removing and demolding said envelope style bus seat back cushion from said mold.

3. A method for manufacturing an envelope style bus seat back cushion as claimed in claim 2, further comprising the steps of:
 guiding said center core insert into said mold cavity.

4. A method for manufacturing an envelope style bus seat back cushion as claimed in claim 3, further comprising the steps of:
 restraining said center core insert within said mold cavity.

5. A method for manufacturing an envelope style bus seat back cushion as claimed in claim 3, further comprising the steps of:
 attaching, releasably, Velcro to said center core insert;
 interengaging said Velcro and said urethane foam, said Velcro remaining in engagement with said urethane foam when said center core insert is removed from said mold cavity.

6. A method of manufacturing an envelope style bus seat as claimed in claim 4 wherein said elastomer skin includes a first polyol and a first isocyanate and further comprising the steps of:
 mixing said first polyol and said first isocyanate at 102 index to form said elastomer skin;
 spraying said elastomer skin into and onto said cavity of said hinged mold;
 coating said cavity of said hinged mold until said elastomer skin has a thickness of approximately 0.9 mm;
 mixing a urethane including a second polyol and a second isocyanate to form said urethane;
 injecting said urethane into said mold at a temperature in the range of 90-140° F.;
 adhering said urethane to said center core insert and said elastomer skin on said mold;
 removing said urethane from said mold within a demold time of 3-4 minutes, said urethane having a molded density in the range of 2.5-4.0 lbs./ft 3.

7. A method of manufacturing an envelope style bus seat cushion as claimed in claim 6 wherein said first polyol has a water content of less than or equal to 0.05%, a viscosity of approximately 1100 centipoise and a specific gravity of approximately 1.033 at 25° C.; and, said first isocyanate has a viscosity of approximately 700 centipoise and a specific gravity of approximately 1.212 at 25° C.;
 mixing said first polyol and said first isocyanate together at a ratio of 100 parts by weight first polyol to 45.5 parts by weight isocyanate to form said elastomer skin;
 said elastomer skin having a thickness in the range of 0.9-1.2 mm, a density of approximately 1.03 g/cm3, a Shore A Hardness of 58, a tensile strength of 1001 psi, an elongation of 263%, a tear strength of 93 lb/in, and a puncture resistance of 271 ppi; and,
 said urethane includes said second polyol and said second isocyanate; said second polyol having a viscosity of approximately 1275 centipoise at 77° F. and said second isocyanate having a viscosity of approximately 33 centipoise at 77° F. and said urethane has a free rise density of 3.10 lbs./ft$^3$.

8. A method of manufacturing an envelope style bus seat cushion as claimed in claim 7 wherein said second polyol and said second isocyanate are mixed in a ratio of 100 parts by weight said second polyol to 48 parts by weight of said second isocyanate.

9. A method for manufacturing an envelope style bus seat back cushion comprising the steps of:
 opening an envelope style bus seat back cushion mold;
 spraying an elastomeric polymer on the surface of said open envelope style bus seat back cushion mold to a predetermined thickness before closing said mold and injecting urethane foam therein;
 closing said mold;
 injecting urethane foam into said closed mold, said mold having a core to form said envelope style bus seat back cushion, said envelope style bus seat back cushion includes: a front portion and a rear portion; said front portion and said rear portion are connected by a joining portion; said front portion, said rear portion, and said joining portion include a closed upper portion; an open lower portion; and an intermediate portion; said front portion, said rear portion, and said joining portion form said upper closed portion; said lower open portion includes an aperture therein in communication with a pocket formed in said intermediate portion; and, said pocket has sides and a bottom reciprocally shaped to slide over a seat back;
 curing said envelope style bus seat back cushion urethane foam and adhering said elastomeric polymer sprayed on said surface of said mold to said urethane foam forming an elastomeric skin thereon;
 extracting said cured envelope style bus seat back cushion urethane foam with said elastomeric skin formed thereon from said mold;
 overspraying said elastomeric skin on said cured envelope style bus seat back cushion urethane foam externally from said mold with an additional layer of elastomeric skin to a desired thickness; and,
 removing said core from said cured envelope style bus seat back cushion urethane foam after said step of overspraying said elastomeric skin on said cured envelope style bus seat back cushion urethane foam externally from said mold with an additional layer of elastomeric skin to a desired thickness.

10. A method for manufacturing an envelope style bus seat back cushion comprising the steps of:
 spraying an elastomeric polymer on the surface of an open envelope style bus seat back cushion mold to a predetermined thickness before closing said mold;
 injecting urethane foam into said envelope style bus seat back cushion mold, said mold having a core to form said envelope style bus seat back cushion, said envelope style bus seat back cushion includes: a front portion and a rear portion; said front portion and said rear portion are connected by a joining portion; said front portion, said rear portion, and said joining portion include a closed upper portion; an open lower portion; and an intermediate portion; said front portion, said rear portion, and said joining portion form said closed upper portion; said open lower portion includes an aperture therein in communication with a pocket formed in said intermediate portion; and said pocket has sides and a bottom reciprocally shaped to slide over a seat back;

transferring said elastomeric polymer from said surface of said open envelope style bus seat back cushion mold to said urethane foam forming an elastomeric skin thereon;

extracting said envelope style bus seat back cushion urethane foam having said elastomeric skin thereon from said mold;

overspraying said envelope style bus seat back cushion urethane foam having said elastomeric skin thereon externally from said mold with an additional elastomeric skin to a desired thickness.

* * * * *